United States Patent
Wang et al.

(10) Patent No.: US 11,160,062 B2
(45) Date of Patent: Oct. 26, 2021

(54) UPLINK CONTROL INFORMATION TRANSMISSION METHOD AND DEVICE

(71) Applicant: HUAWEI TECHNOLOGIES CO., LTD., Shenzhen (CN)

(72) Inventors: Da Wang, Shenzhen (CN); Hua Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 16/644,464

(22) PCT Filed: May 16, 2018

(86) PCT No.: PCT/CN2018/087178
§ 371 (c)(1),
(2) Date: Mar. 4, 2020

(87) PCT Pub. No.: WO2019/047556
PCT Pub. Date: Mar. 14, 2019

(65) Prior Publication Data
US 2021/0068098 A1 Mar. 4, 2021

(30) Foreign Application Priority Data
Sep. 8, 2017 (CN) .......................... 201710807162.X

(51) Int. Cl.
H04W 72/04 (2009.01)
H04L 5/00 (2006.01)

(52) U.S. Cl.
CPC ....... *H04W 72/0413* (2013.01); *H04L 5/0007* (2013.01); *H04W 72/0446* (2013.01); *H04W 72/0453* (2013.01)

(58) Field of Classification Search
CPC ......... H04W 72/0413; H04W 72/0453; H04W 72/0446; H04L 5/0007
See application file for complete search history.

(56) References Cited

U.S. PATENT DOCUMENTS

2018/0131430 A1    5/2018   Gao et al.
2019/0045536 A1    2/2019   Gao et al.
(Continued)

FOREIGN PATENT DOCUMENTS

CN    102075309 A    5/2011
CN    103188039 A    7/2013
(Continued)

OTHER PUBLICATIONS

R1-1712192 Huawei, HiSilicon, "Long PUCCH for up to 2 bits UCI",3GPP TSG RAN WG1 Meeting #90,Prague, Czech Republic, Aug. 21-25, 2017, total 7 pages.
(Continued)

*Primary Examiner* — Brian D Nguyen
(74) *Attorney, Agent, or Firm* — Hauptman Ham, LLP

(57) ABSTRACT

An uplink control information transmission method includes: determining, by a terminal device, symbols occupied by first uplink control information in M time resource units; and transmitting the first uplink control information based on the symbols occupied by the first uplink control information in the M time resource units, where the first uplink control information occupies some or all symbols that are used to transmit uplink control information in each of the M time resource units, and occupies all symbols that are used to transmit the uplink control information in each of N–M time resource units other than the M time resource units.

20 Claims, 13 Drawing Sheets

(56) References Cited

U.S. PATENT DOCUMENTS

| | | | |
|---|---|---|---|
| 2019/0268089 A1 | 8/2019 | Fu et al. | |
| 2020/0170007 A1* | 5/2020 | Gao | H04L 27/2602 |
| 2020/0177423 A1* | 6/2020 | Gao | H04W 80/08 |
| 2020/0187194 A1* | 6/2020 | Gao | H04L 5/0012 |
| 2020/0213031 A1* | 7/2020 | Gao | H04L 1/0006 |
| 2020/0235892 A1* | 7/2020 | Marinier | H04W 52/0216 |
| 2020/0288461 A1* | 9/2020 | Hwang | H04L 27/26 |
| 2020/0396732 A1* | 12/2020 | Hwang | H04L 5/0055 |

FOREIGN PATENT DOCUMENTS

| | | |
|---|---|---|
| CN | 106209330 A | 12/2016 |
| CN | 107027181 A | 8/2017 |
| CN | 108023849 A | 5/2018 |
| EP | 2793525 A1 | 10/2014 |
| WO | 2013099269 A1 | 7/2013 |
| WO | 2016119251 A1 | 8/2016 |
| WO | 2017167242 A1 | 10/2017 |

OTHER PUBLICATIONS

International search report dated Jul. 27, 2018 from corresponding application No. PCT/CN2018/087178.

Office Action dated Jul. 18, 2019 from corresponding application No. CN 201710807162.X.

R1-1800034 Huawei, HiSilicon, "Long PUCCH over multiple slots with different duration in each slot",3GPP TSG RAN WGI Ad Hoc Meeting,Vancouver, Canada, Jan. 22-26, 2018,total 3 pages.

R1-1712194 Huawei, HiSilicon, "Support of long-PUCCH over multiple slots",3GPP TSG RAN WGI Meeting #90, Prague, Czech Republic, Aug. 21-25, 2017,total 4 pages.

R1-1707396 Intel Corporation, "Time and frequency domain resource allocation for long PUCCH",3GPP TSG RAN WG1 Meeting #89,Hangzhou, P. R. China May 15-19, 2017,total 5 pages.

Extended European search report dated Jul. 1, 2020 from corresponding application No. EP 18854397.9.

* cited by examiner

UPLINK CONTROL INFORMATION TRANSMISSION METHOD AND DEVICE

RELATED APPLICATIONS

This application is a National Stage of International Application No. PCT/CN2018/087178, filed on May 16, 2018, which claims priority to Chinese Patent Application No. 201710807162.X, filed on Sep. 8, 2017.

TECHNICAL FIELD

This application relates to the field of wireless communications technologies, and in particular, to an uplink control information transmission method and a device.

BACKGROUND

The 5th generation (5G) communications technology provides a new communications protocol: a 5G new radio (NR) communications protocol. According to discussions on the 5G NR, a quantity of symbols occupied by a physical uplink control channel (PUCCH) may change, uplink control information is carried on the physical uplink control channel, a physical uplink control channel resource is in a one-to-one correspondence with the uplink control information, and therefore, a quantity of symbols occupied by the uplink control information may be different. It is specified in the standard that the quantity of symbols used to transmit the uplink control information is an integer from 4 to 14. A quantity of symbols included in an uplink transmission resource in each timeslot is different, and in addition, the symbols included in the uplink transmission resource may be used to transmit the uplink control information or used for other uplink transmission. Therefore, the quantity of symbols that are used to transmit the uplink control information in each timeslot is different.

When a subcarrier spacing is 15 kHz, the physical uplink control channel needs to occupy 14 symbols to achieve a same transmission range as that of a Long Term Evolution (LTE) system. Therefore, the physical uplink control channel may need to occupy a plurality of timeslots for transmission, where the plurality of timeslots may be consecutive timeslots or inconsecutive timeslots. Therefore, the quantity of symbols occupied on each timeslot to transmit the uplink control information may be different.

Some uplink control information transmission solutions are provided in the prior art:

Solution 1: The terminal device occupies all symbols that are used to transmit the uplink control information in each timeslot to transmit the uplink control information. For example, the first timeslot includes 10 symbols used to transmit the uplink control information, and the second timeslot includes 12 symbols used to transmit the uplink control information. Actually, the quantity of symbols that need to be occupied by the uplink control information is 14 (it is assumed that the subcarrier spacing is 15 kHz), the quantity of symbols that are used to transmit the uplink control information in the first timeslot is less than 14, and therefore, the uplink control information occupies all the symbols that are used to transmit the uplink control information in the first timeslot and the second first timeslot. In the method of this solution, the uplink control information occupies all the symbols that are used to transmit the uplink control information in the two timeslots, and occupies 22 symbols in total. In this case, uplink transmission resources of 8 symbols are wasted. Therefore, solution 1 may cause resource waste.

Solution 2: The terminal device occupies, based on the quantity of symbols that need to be occupied by the uplink control information, symbols that are used to transmit the uplink control information in each timeslot to transmit the uplink control information. For example, the first timeslot includes 10 symbols used to transmit the uplink control information, and the second timeslot includes 12 symbols used to transmit the uplink control information. Actually, the quantity of symbols that need to be occupied by the uplink control information is 14 (it is assumed that the subcarrier spacing is 15 kHz), and the quantity of symbols that are used to transmit the uplink control information in the first timeslot is less than 14. In the method of this solution, the uplink control information occupies 10 symbols that are used to transmit the uplink control information in the first timeslot, and occupies only 4 symbols that are used to transmit the uplink control information in the second timeslot. The network device leaves other 8 symbols that are used to transmit the uplink control information for use by other terminal devices, and adjusts, for other terminal devices based on the physical uplink control channel resource in the second timeslot, a frequency hopping point in the physical uplink control channel resource, an orthogonal cover code (OCC) configuration, and the like. Consequently, a structure of a physical uplink control channel in each timeslot needs to be configured half-statically or dynamically. Solution 2 may cause relatively fragmental physical uplink control channel resources in the timeslot. Other terminal devices cannot multiplex the physical uplink control channel resources, designs of frequency hopping and an OCC are relatively complex, and complexity of the network device in scheduling other terminal devices is improved.

Solution 3: Quantities of symbols that are occupied in all timeslots to transmit the uplink control information are equal. Solution 3 may also cause the problem in solution 2.

It should be understood from the foregoing description that, when the terminal device occupies a plurality of timeslots to transmit the uplink control information, resource is wasted, resource utilization is not high, it is difficult for other terminal devices to multiplex the physical uplink control channel resources, designs of frequency hopping and OCC are complex, and the like.

SUMMARY

Embodiments of this application provide an uplink control information transmission method and a device to optimize an existing uplink control information transmission method.

According to a first aspect, this application provides an uplink control information transmission method, including: determining, by a terminal device, symbols occupied by first uplink control information in M time resource units; and transmitting, by the terminal device, the first uplink control information based on the symbols occupied by the first uplink control information in the M time resource units, where the first uplink control information occupies some or all symbols that are used to transmit uplink control information in each of the M time resource units, and occupies all symbols that are used to transmit the uplink control information in each of N−M time resource units other than the M time resource units; where the first uplink control information is carried on a physical uplink control channel, the M time resource units are time resource units in N time resource units, N≥2, M≥1, and both N and M are positive integers.

In this way, resource utilization is improved by using the method provided in this application, other terminal devices may multiplex physical uplink control channel resources, and neither frequency hopping nor time domain OCC needs to be re-designed.

In some embodiments, the symbols occupied by the first uplink control information in the M time resource units are all the symbols that are used to transmit the uplink control information in each of the M time resource units, or some symbols that are used to transmit the uplink control information in each of the M time resource units, or some symbols that are used to transmit the uplink control information in each of M1 time resource units and all symbols that are used to transmit the uplink control information in each of M2 time resource units, where M1+M2=M, and both M1 and M2 are positive integers.

Therefore, there are a plurality of possibilities of the symbols occupied by the first uplink control information in the M time resource units, and there are a plurality of possible forms of the symbols occupied by the terminal device to transmit the first uplink control information.

In some embodiments, some symbols that are used to transmit the uplink control information in the $i^{th}$ time resource unit start from a start symbol that is used to transmit the uplink control information in the $i^{th}$ time resource unit, and end with the last symbol before a frequency hopping point of any physical uplink control channel in the $i^{th}$ time resource unit; or some symbols that are used to transmit the uplink control information in the $i^{th}$ time resource unit start from the first symbol after a frequency hopping point of any physical uplink control channel in the $i^{th}$ time resource unit, and end with an end symbol that is used to transmit the uplink control information in the $i^{th}$ time resource unit; or some symbols that are used to transmit the uplink control information in the $i^{th}$ time resource unit start from the first symbol after a frequency hopping point of a first physical uplink control channel in the $i^{th}$ time resource unit, and end with the last symbol before a frequency hopping point of a second physical uplink control channel, and the $i^{th}$ time resource unit includes frequency hopping points of at least two physical uplink control channels; where the $i^{th}$ time resource unit is any one of the M time resource units.

Alternatively, when the $i^{th}$ time resource unit includes frequency hopping points of at least two physical uplink control channels, some symbols that are used to transmit the uplink control information in the $i^{th}$ time resource unit may be symbols included in any physical uplink control channel in the $i^{th}$ time resource unit.

Alternatively, when the $i^{th}$ time resource unit includes frequency hopping points of K physical uplink control channels, where K≥2, some symbols that are used to transmit the uplink control information in the $i^{th}$ time resource unit may start from the first symbol after a frequency hopping point of the $n^{th}$ physical uplink control channel in the $i^{th}$ time resource unit, and end with the last symbol of the $n^{th}$ physical uplink control channel resource, where K≥n≥1. Alternatively, some symbols that are used to transmit the uplink control information in the $i^{th}$ time resource unit may start from the first symbol of the $m^{th}$ physical uplink control channel resource, and end with the last symbol before a frequency hopping point of the $m^{th}$ physical uplink control channel, where K≥m>1.

Therefore, there are a plurality of possible forms of some symbols that are used to transmit the uplink control information in the $i^{th}$ time resource unit, which can effectively save resources.

In some embodiments, the terminal device may use but is not limited to the following methods to determine the symbols that are occupied in the M time resource units to transmit the first uplink control information.

Method 1: The terminal device receives first information sent by the network device, where the first information is used to indicate the symbols occupied by the first uplink control information in the M time resource units; and the terminal device determines, based on the first information, the symbols occupied by the first uplink control information in the M time resource units.

Method 2: The terminal device receives second information sent by the network device, where the second information is used to indicate a quantity of symbols that need to be occupied to transmit the first uplink control information; and the terminal device determines, based on the quantity of symbols that need to be occupied to transmit the first uplink control information and the quantity of symbols that are used to transmit the uplink control information in each of the N time resource units, the symbols occupied by the first uplink control information in the M time resource units.

Method 3: The terminal device receives third information sent by the network device, where the third information is used to indicate a start location and/or an end location of the symbol that is occupied by the first uplink control information in each of the M time resource units; and the terminal device determines, based on the third information, the symbols that are occupied by the first uplink control information in the M time resource units.

In some embodiments, the method may include the following three possible forms:

(1) The third information indicates the start location of the symbol that is occupied by the first uplink control information in each of the M time resource units. The end location of the symbol that is occupied by the first uplink control information in each time resource unit is considered by default an end symbol that is used to transmit the uplink control information in each time resource unit.

(2) The third information indicates the end location of the symbol that is occupied by the first uplink control information in each of the M time resource units. The start location of the symbol that is occupied by the first uplink control information in each time resource unit is considered by default a start symbol that is used to transmit the uplink control information in each time resource unit.

(3) The third information indicates the start location and the end location of the symbol that is occupied by the first uplink control information in each of the M time resource units.

Method 4:

The terminal device determines, based on the quantity of symbols that need to be occupied by the first uplink control information and the quantity of symbols that are used to transmit the uplink control information in each of the N time resource units, the symbols occupied by the first uplink control information in the M time resource units. In this case, the terminal device does not need to determine, based on a message of the network device, the symbols occupied by the first uplink control information in the M time resource units, and the quantity of symbols that need to be occupied to transmit the first uplink control information may be specified by using a protocol or may be specified by a sender and a receiver.

Therefore, the terminal device may determine the symbols occupied by first uplink control information in the M time resource units in a plurality of manners, which is flexible, convenient, and easy to implement.

In some embodiments, the M time resource units include a frequency hopping point of only one physical uplink control channel, and M=1; and the terminal device may use but is not limited to the following method to determine, based on the quantity of symbols that need to be occupied to transmit the first uplink control information and the quantity of symbols that are used to transmit the uplink control information in each of the N time resource units, the symbols occupied to transmit the first uplink control information in the M time resource units: if a first value is less than or equal to a target value, determining, by the terminal device, to occupy X symbols that are used to transmit the uplink control information in the M time resource units to transmit the first uplink control information; or if the first value is greater than the target value, determining, by the terminal device, to occupy all symbols that are used to transmit the uplink control information in the M time resource units to transmit the first uplink control information; where the first value and the target value are determined based on the quantity of symbols that need to be occupied to transmit the first uplink control information and the quantity of symbols that are used to transmit the uplink control information in each of the N time resource units, and X is a quantity of symbols starting from a start symbol that is used to transmit the uplink control information in the M time resource units, and ending with the last symbol before a frequency hopping point of the physical uplink control channel in the M time resource units, or X is a quantity of symbols starting from the first symbol after the frequency hopping point of the physical uplink control channel in the M time resource units, and ending with an end symbol that is used to transmit the uplink control information in the M time resource units.

Therefore, the terminal device may relatively easily determine the symbols occupied by first uplink control information in the M time resource units. This method is relatively simple and easy to implement.

In some embodiments, the first value is a difference between the quantity of symbols that need to be occupied to transmit the first uplink control information and a total quantity of symbols that are used to transmit the uplink control information in the N–M time resource units, and the total quantity of symbols that are used to transmit the uplink control information in the N–M time resource units is determined by the terminal device based on a quantity of symbols that are used to transmit the uplink control information in each of the N–M time resource units.

In some embodiments, the target value is less than or equal to X.

The first value and the target value have a plurality of possible implementations.

In some embodiments, the time resource unit is any one of a subframe, a timeslot, a mini-slot, and an orthogonal frequency division multiplexing OFDM symbol.

In some embodiments, the physical uplink control channel is a long duration physical uplink control channel.

According to a second aspect, this application provides an uplink control information transmission method, including: receiving, by a network device, first uplink control information sent by a terminal device, where the first uplink control information occupies some or all symbols that are used to transmit uplink control information in each of M time resource units, and occupies all symbols that are used to transmit the uplink control information in each of N–M time resource units other than the M time resource units; and determining, by the network device based on the first uplink control information, a receiving result of downlink data of the terminal device, an uplink scheduling request, or a channel measurement result. The first uplink control information is carried on a physical uplink control channel, the M time resource units are time resource units in N time resource units, $N \geq 2$, $M \geq 1$, and both N and M are positive integers.

In some embodiments, some symbols that are used to transmit the uplink control information in the $i^{th}$ time resource unit start from a start symbol that is used to transmit the uplink control information in the $i^{th}$ time resource unit, and end with the last symbol before a frequency hopping point of any physical uplink control channel in the $i^{th}$ time resource unit; or some symbols that are used to transmit the uplink control information in the $i^{th}$ time resource unit start from the first symbol after a frequency hopping point of any physical uplink control channel in the $i^{th}$ time resource unit, and end with an end symbol that is used to transmit the uplink control information in the $i^{th}$ time resource unit; or some symbols that are used to transmit the uplink control information in the $i^{th}$ time resource unit start from the first symbol after a frequency hopping point of a first physical uplink control channel in the $i^{th}$ time resource unit, and end with the last symbol before a frequency hopping point of a second physical uplink control channel, and the $i^{th}$ time resource unit includes frequency hopping points of at least two physical uplink control channels; where the $i^{th}$ time resource unit is any one of the M time resource units.

In some embodiments, before the receiving, by a network device, first uplink control information sent by a terminal device, the method includes: sending, by the network device, first information to the terminal device, where the first information is used to indicate symbols occupied by the first uplink control information in the M time resource units.

In some embodiments, before the receiving, by a network device, first uplink control information sent by a terminal device, the method includes:

sending, by the network device, second information to the terminal device, where the second information is used to indicate a quantity of symbols that need to be occupied to transmit the first uplink control information, so that the terminal device determines the symbols that are occupied by the first uplink control information in the M time resource units.

In some embodiments, the network device sends third information to the terminal device, where the third information is used to indicate a start location and/or an end location of the symbol that is occupied by the first uplink control information in each of the M time resource units, so that the terminal device determines the symbols that are occupied by the first uplink control information in the M time resource units.

In some embodiments, the symbols occupied by the first uplink control information in the M time resource units are all the symbols that are used to transmit the uplink control information in each of the M time resource units, or some symbols that are used to transmit the uplink control information in each of the M time resource units, or some symbols that are used to transmit the uplink control information in each of M1 time resource units and all symbols that are used to transmit the uplink control information in each of M2 time resource units, where M1+M2=M, and both M1 and M2 are positive integers.

In some embodiments, the M time resource units include a frequency hopping point of only one physical uplink control channel, and M=1; and if a first value is less than or equal to a target value, the symbols occupied by the first uplink control information in the M time resource units are X symbols that are used to transmit the uplink control information in the M time resource units; or if the first value is greater than the target value, the symbols occupied by the first uplink control information in the M time resource units are all the symbols that are used to transmit the uplink control information in the M time resource units; where the first value and the target value are determined based on the quantity of symbols that need to be occupied to transmit the first uplink control information and the quantity of symbols that are used to transmit the uplink control information in each of the N time resource units, and X is a quantity of symbols starting from a start symbol that is used to transmit the uplink control information in the M time resource units, and ending with the last symbol before a frequency hopping point of the physical uplink control channel in the M time resource units, or X is a quantity of symbols starting from the first symbol after the frequency hopping point of the physical uplink control channel in the M time resource units, and ending with an end symbol that is used to transmit the uplink control information in the M time resource units.

In some embodiments, the first value is a difference between the quantity of symbols that need to be occupied to transmit the first uplink control information and a total quantity of symbols that are used to transmit the uplink control information in the N−M time resource units, and the total quantity of symbols that are used to transmit the uplink control information in the N−M time resource units is determined by the terminal device based on a quantity of symbols that are used to transmit the uplink control information in each of the N−M time resource units.

In some embodiments, the target value is less than or equal to X.

In some embodiments, the time resource unit is any one of a subframe, a timeslot, a mini-slot, and an OFDM symbol.

In some embodiments, the physical uplink control channel is a long duration physical uplink control channel.

According to a third aspect, this application provides an uplink control information transmission apparatus, including: a processing unit and a sending unit. The processing unit is configured to determine symbols occupied by first uplink control information in M time resource units; and the sending unit is configured to transmit the first uplink control information based on the symbols occupied by the first uplink control information in the M time resource units, where the first uplink control information occupies some or all symbols that are used to transmit uplink control information in each of the M time resource units, and occupies all symbols that are used to transmit the uplink control information in each of N−M time resource units other than the M time resource units; where the first uplink control information is carried on a physical uplink control channel, the M time resource units are time resource units in N time resource units, N≥2, M≥1, and both N and M are positive integers.

According to a fourth aspect, this application provides an uplink control information transmission apparatus, including: a receiving unit and a processing unit. The receiving unit is configured to receive first uplink control information sent by a terminal device, where the first uplink control information occupies some or all symbols that are used to transmit uplink control information in each of M time resource units, and occupies all symbols that are used to transmit the uplink control information in each of N−M time resource units other than the M time resource units; and the processing unit is configured to determine, based on the first uplink control information, a receiving result of downlink data of the terminal device, an uplink scheduling request, or a channel measurement result; where the first uplink control information is carried on a physical uplink control channel, the M time resource units are time resource units in N time resource units, N≥2, M≥1, and both N and M are positive integers.

According to a fifth aspect, this application provides a terminal device, including a transceiver, a processor, and a memory. The memory is configured to store a program; the transceiver is configured to send and receive data; and the processor is configured to invoke and execute the program stored in the memory, so as to implement the method described in the first aspect by using the transceiver to send and receive the data.

According to a sixth aspect, this application provides a network device, including a transceiver, a processor, and a memory. The memory is configured to store a program; the transceiver is configured to send and receive data; and the processor is configured to invoke and execute the program stored in the memory, so as to implement the method described in the second aspect by using the transceiver to send and receive the data.

According to a seventh aspect, this application further provides a communications system, and the communications system includes the network device described in the sixth aspect and the terminal device described in the fifth aspect.

According to an eighth aspect, this application provides a chip, where the chip is connected to a memory, and is configured to read and perform a program stored in the memory, so as to implement the method described in the first aspect.

According to a ninth aspect, this application provides a chip, where the chip is connected to a memory, and is configured to read and perform a program stored in the memory, so as to implement the method described in the second aspect.

According to a tenth aspect, this application provides a computer storage medium storing a computer executable instruction, where when the computer executable instruction runs on a computer, the computer is caused to perform the method described in the first aspect.

According to an eleventh aspect, this application provides a computer storage medium storing a computer executable instruction, where when the computer executable instruction runs on a computer, the computer is caused to perform the method described in the second aspect.

According to a twelfth aspect, this application further provides a computer program product, where the computer program product includes the computer executable instruction stored in the foregoing computer storage medium; and when the computer executable instruction runs on a computer, the computer is caused to perform the method described in the first aspect of this application.

According to a thirteenth aspect, this application further provides a computer program product, where the computer program product includes the computer executable instruction stored in the foregoing computer storage medium; and when the computer executable instruction runs on a computer, the computer is caused to perform the method described in the first aspect of this application.

DESCRIPTION OF EMBODIMENTS

Figure 1:
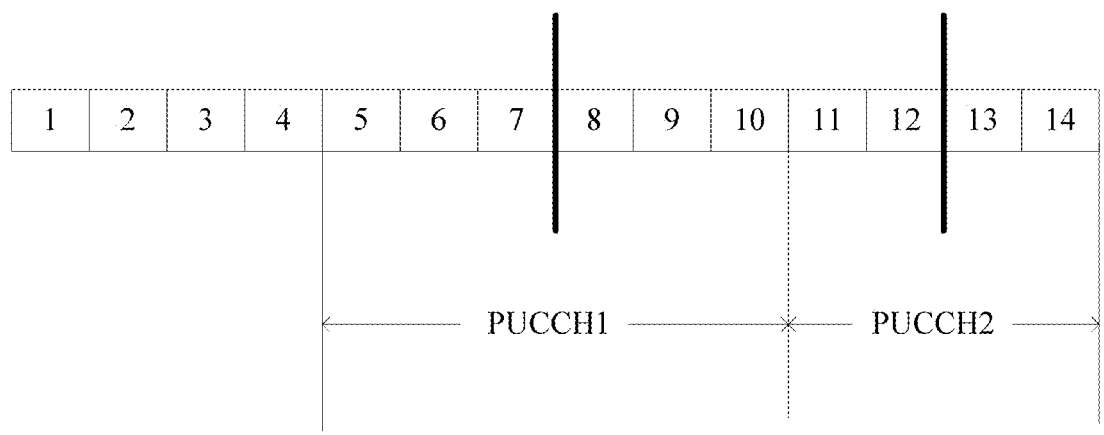
FIG. 1 is a schematic diagram of two frequency hopping points included in one time resource unit, in accordance with one or more embodiments.

The following describes the embodiments of this application with reference to accompanying drawings.

Network elements used in the embodiments of this application include a network device and a terminal. The network device is an access device that is used by a terminal to access the mobile communications system in a wireless manner. The network device may be a NodeB, an evolved NodeB (eNodeB), a NodeB in a 5G mobile communications system, a NodeB in a future mobile communications system, an access node in a Wi-Fi system, and the like. The embodiments of this application impose no limitation on a specific technology used by and a specific device form of the network device.

A terminal device, or Terminal equipment, may also be referred to as a terminal, user equipment (UE), a mobile station (MS), a mobile terminal (MT), and the like. The terminal device may be a mobile phone, a tablet computer, a computer with a wireless transceiver function, a virtual reality (VR) terminal device, an augmented reality (AR) terminal device, a wireless terminal in industrial control, a wireless terminal in self-driving, a wireless terminal in remote surgery, or remote medical surgery, a wireless terminal in a smart grid, a wireless terminal in transportation safety, a wireless terminal in a smart city, a wireless terminal in a smart home, and the like.

The 5G NR supports two types of uplink control channels (UL control): a short duration physical uplink control channel (Short PUCCH) and a long duration physical uplink control channel (Long PUCCH). The short PUCCH occupies one or two symbols for transmission. The long PUCCH needs to occupy more symbols for transmission, because the long PUCCH needs to meet a transmission range requirement. Physical uplink control channels mentioned in this application are long duration physical uplink control channels (long PUCCH).

It should be understood that uplink control information (UCI) in this application may be feedback received by the terminal device for downlink data, for example, a positive acknowledgement (acknowledge) or a negative acknowledgement (negative acknowledge). Alternatively, the UCI may be feedback on downlink channel measurement from the terminal device, for example, a rank indication (RI), a channel quality indicator (CQI), a precoding matrix indication (PMI), a channel state information measurement reference signal resource indicator (CRI), a precoding type indicator (PTI), and a beam measurement result. Alternatively, the UCI may be an uplink scheduling request of the terminal device, for example, a scheduling request (SR).

The UCI is sent to the network device by the terminal device by using the physical uplink control channel. When reporting the UCI, the terminal device needs to map the UCI on a physical uplink control channel resource, so that the network device can receive, on a corresponding physical uplink control channel resource, the UCI reported by the terminal device.

A time resource unit in this application may be any one of a subframe, a frame, a timeslot, a mini-slot or non-slot, and P orthogonal frequency division multiplexing (OFDM) symbols, where P is an integer greater than or equal to 1.

A frequency hopping point in this application is a frequency hopping time point. One time resource unit may include a plurality of physical uplink control channels, and a quantity of frequency hopping points of each physical uplink control channel is less than or equal to 1.

For example, when one time resource unit includes one physical uplink control channel, the physical uplink control channel includes one frequency hopping point. Therefore, a frequency resource corresponding to symbols from a start symbol that is used to transmit the uplink control information (that is, starting from a start symbol of the symbols occupied by the physical uplink control channel) to the last symbol before a frequency hopping point of the physical uplink control channel is a first frequency resource; and a frequency resource corresponding to symbols from the first symbol after the frequency hopping point of the physical uplink control channel to an end symbol used to transmit the uplink control information (that is, an end symbol of the symbols occupied by the physical uplink control channel) is a second frequency resource. A first frequency is different from a second frequency.

For another example, when one time resource unit includes two physical uplink control channels, and the two physical uplink control channels occupy symbols that are not totally the same, a first physical uplink control channel includes one frequency hopping point, and a second physical uplink control channel includes another frequency hopping point. As shown in FIG. 1, the PUCCH1 occupies a symbol 5 to a symbol 10, which includes one frequency hopping point, and the frequency hopping point is between a symbol 7 and a symbol 8. The PUCCH2 occupies a symbol 11 to a symbol 14, which includes another frequency hopping point, and the frequency hopping point is between a symbol 12 and a symbol 13.

Figure 2:
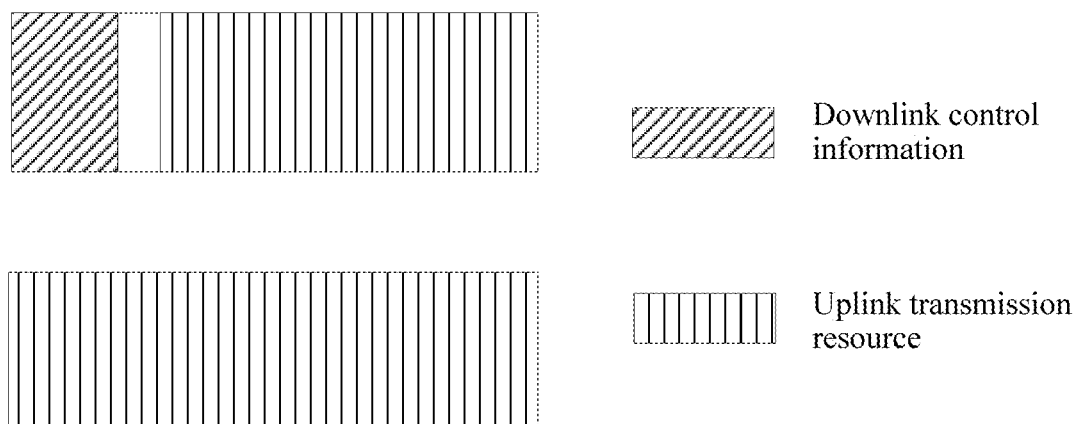
FIG. 2 is a schematic structural diagram of two possible timeslot structures, in accordance with one or more embodiments.

An NR timeslot structure may be changed, and a quantity of symbols included in the timeslot may be 7 or 14. For example, two structures shown in FIG. 2 exist, which include an uplink transmission resource domain (UL domain) timeslot structure and an uplink transmission resource only (UL only) timeslot structure. In the UL domain timeslot structure, first two or three symbols are downlink transmission resources and gaps, where the gap is used for switching between uplink and downlink, and remaining symbols are the uplink transmission resources. In the UL only timeslot structure, all symbols are the uplink transmission resources.

Therefore, because of different timeslot structures, not all symbols in the timeslot are used to transmit the uplink control information. A quantity of symbols that the long PUCCH needs to occupy may vary with the subcarrier spacing, and therefore, the uplink control information needs to occupy uplink transmission resources on a plurality of timeslots for transmission. This application focuses on design of a quantity of symbols that are occupied by the terminal device in each time resource unit to transmit the uplink control information when the terminal device transmits the uplink control information in a plurality of time resource units.

Figure 3:
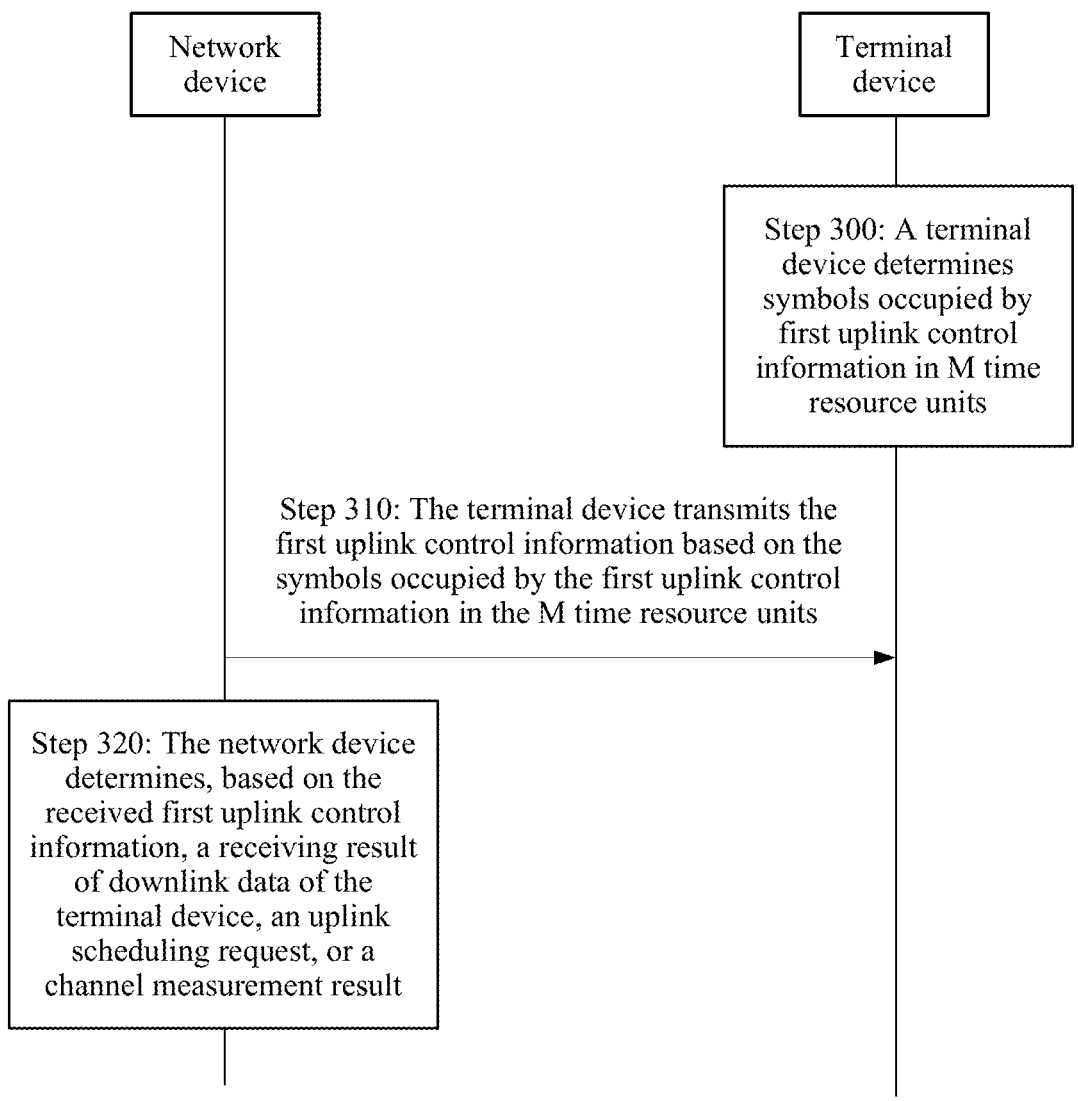
FIG. 3 is a flowchart of description of uplink control information transmission, in accordance with one or more embodiments.

Referring to FIG. 3, this application provides an uplink control information transmission method. The method includes the following steps.

Step 300: A terminal device determines symbols occupied by first uplink control information in M time resource units.

The M time resource units are time resource units in N time resource units, N≥2, M≥1, and both N and M are positive integers. The first uplink control information is carried on a physical uplink control channel.

Step 310: The terminal device transmits the first uplink control information based on the symbols occupied by the first uplink control information in the M time resource units, where the first uplink control information occupies some or all symbols that are used to transmit uplink control information in each of the M time resource units, and occupies all symbols that are used to transmit the uplink control information in each of N–M time resource units other than the M time resource units.

Step 320: The network device determines, based on the received first uplink control information, a receiving result of downlink data of the terminal device, an uplink scheduling request, or a channel measurement result.

For step 300, the symbols occupied by the first uplink control information in the M time resource units are all the symbols that are used to transmit the uplink control information in each of the M time resource units, or some symbols that are used to transmit the uplink control information in each of the M time resource units, or some symbols that are used to transmit the uplink control information in each of M1 time resource units and all symbols that are used to transmit the uplink control information in each of M2 time resource units, where M1+M2=M, and both M1 and M2 are positive integers.

For example, when M=1, the symbols occupied by the first uplink control information in the M time resource units are all symbols that are used to transmit the uplink control information in the time resource unit or some symbols that are used to transmit the uplink control information in the time resource unit.

For example, when M=3, the symbols occupied by the first uplink control information in the M time resource units may be all the symbols that are used to transmit the uplink control information in each of the three time resource units, or some symbols that are used to transmit the uplink control information in each of the three time resource units, or all symbols that are used to transmit the uplink control information in one of the three time resource units and some symbols that are used to transmit the uplink control information in each of remaining two time resource units.

Figure 4:
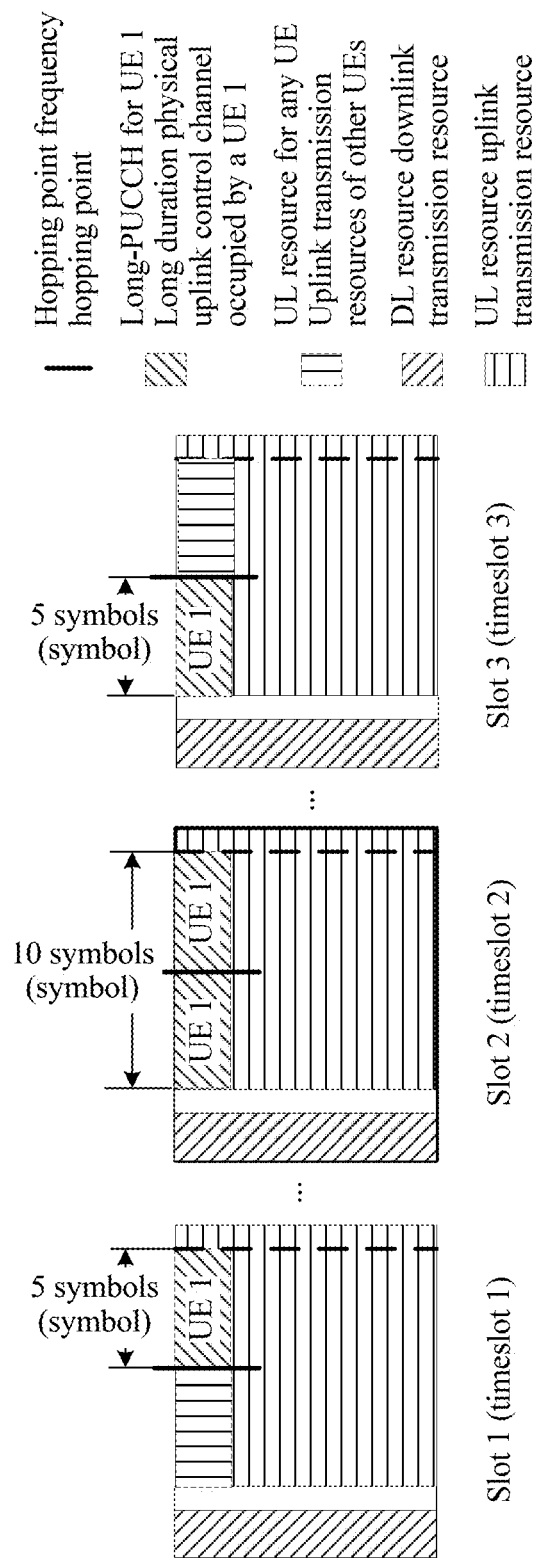
FIG. 4 is a first schematic diagram of N time resource units occupied by first uplink control information for transmission, in accordance with one or more embodiments.

When N=3 and M=2, as shown in FIG. 4, the M time resource units are a slot 1 and a slot 3, and the N–M time resource units are a slot 2. The first uplink control information occupies some symbols that are used to transmit the uplink control information in the slot 1 and the slot 3, and occupies all symbols that are used to transmit the uplink control information in the slot 2.

Further, it is assumed that the $i^{th}$ time resource unit is any one of the M time resource units. That some symbols are used to transmit the uplink control information in the $i^{th}$ time resource unit may include the following three cases:

Case 1:

Some symbols that are used to transmit the uplink control information in the $i^{th}$ time resource unit start from a start symbol that is used to transmit the uplink control information in the $i^{th}$ time resource unit, and end with the last symbol before a frequency hopping point of any physical uplink control channel in the $i^{th}$ time resource unit.

Figure 5:
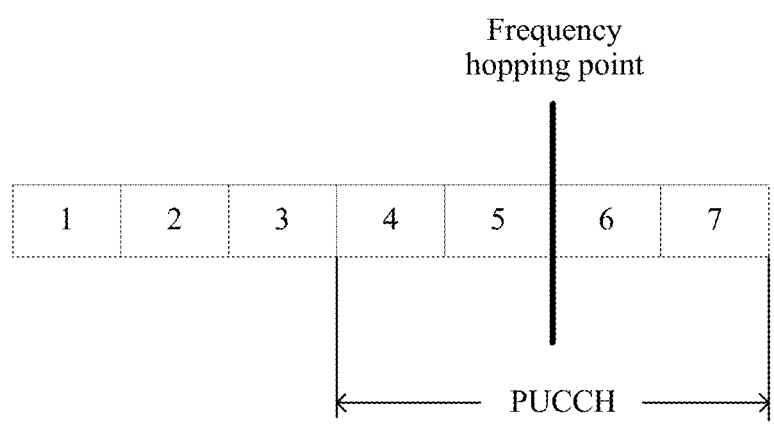
FIG. 5 is a second schematic diagram of N time resource units occupied by first uplink control information for transmission, in accordance with one or more embodiments.

For example, as shown in FIG. 5, FIG. 5 shows a slot or a mini-slot with a length of seven symbols, and some symbols used to transmit the uplink control information are a symbol 4 and a symbol 5.

For another example, as shown in FIG. 1, some symbols used to transmit the uplink control information are the symbol 5 to a symbol 7, or some symbols used to transmit the uplink control information are the symbol 5 to a symbol 12.

Case 2:

Some symbols that are used to transmit the uplink control information in the $i^{th}$ time resource unit start from the first symbol after a frequency hopping point of any physical uplink control channel in the $i^{th}$ time resource unit, and end with an end symbol that is used to transmit the uplink control information in the $i^{th}$ time resource unit.

For example, as shown in FIG. 5, some symbols used to transmit the uplink control information are a symbol 6 and a symbol 7.

For another example, as shown in FIG. 1, some symbols used to transmit the uplink control information are a symbol 8 to a symbol 14, or some symbols used to transmit the uplink control information are a symbol 13 and a symbol 14.

Case 3:

Some symbols that are used to transmit the uplink control information in the $i^{th}$ time resource unit start from the first symbol after a frequency hopping point of a first physical uplink control channel in the $i^{th}$ time resource unit, and end with the last symbol before a frequency hopping point of a second physical uplink control channel, and the $i^{th}$ time resource unit includes frequency hopping points of at least two physical uplink control channels.

For example, as shown in FIG. 1, some symbols used to transmit the uplink control information are the symbol 8 to the symbol 12.

In addition, in some embodiments, when the $i^{th}$ time resource unit includes frequency hopping points of at least two physical uplink control channels, some symbols that are used to transmit the uplink control information in the $i^{th}$ time resource unit may alternatively be symbols included in any physical uplink control channel in the $i^{th}$ time resource unit. For example, as shown in FIG. 1, some symbols that are used to transmit the uplink control information are a symbol 5 to a symbol 10, or some symbols that are used to transmit the uplink control information are a symbol 11 to the symbol 14.

In some embodiments, when the $i^{th}$ time resource unit includes frequency hopping points of K physical uplink control channels, where K≥2, some symbols that are used to transmit the uplink control information in the $i^{th}$ time resource unit may alternatively start from the first symbol after a frequency hopping point of the $n^{th}$ physical uplink control channel in the $i^{th}$ time resource unit, and end with the last symbol of the $n^{th}$ physical uplink control channel resource, where K≥n≥1. For example, as shown in FIG. 1, some symbols used to transmit the uplink control information are the symbol 8 to the symbol 10. Alternatively, some symbols that are used to transmit the uplink control information in the $i^{th}$ time resource unit may start from the first symbol of the $m^{th}$ physical uplink control channel resource, and end with the last symbol before a frequency hopping point of the $m^{th}$ physical uplink control channel, where K≥m≥1. For example, as shown in FIG. 1, some symbols used to transmit the uplink control information are the symbol 11 and the symbol 12.

For step 300, the terminal device may use but is not limited to the following three methods to determine the symbols occupied by the first uplink control information in the M time resource units.

Method 1:

The network device sends first information to the terminal device, where the first information is used to indicate the symbols occupied by the first uplink control information in the M time resource units.

The terminal device receives the first information sent by the network device, and determines, based on the first information, the symbols occupied by the first uplink control information in the M time resource units.

For example, when a downlink data receiving state (for example, ACK/NACK) is fed back, the first information is indicated in corresponding downlink control information (DCI) used for feeding back a downlink data receiving state, or is indicated in corresponding DCI used for triggering feedback, or is indicated in half-static signaling such as radio resource control (RRC).

For example, in an aperiodic signal condition such as triggered channel state information measurement reference signal feedback (CSI feedback) or SR, the first information is indicated in corresponding DCI used for triggering.

For example, in a periodic signal condition such as periodic CSI feedback or the periodic SR, the first information is indicated in the half-static signaling.

For example, 1 in the first information represents occupying all symbols that are used to transmit the uplink control information in the time resource unit, and 0 represents occupying some symbols that are used to transmit the uplink control information in the time resource unit. When M=1, and the first information is 1, it indicates that the symbols occupied by the first uplink control information in the M time resource units are all the symbols that are used to transmit the uplink control information in the time resource unit. When M=3, and the first information is 110, a bitmap may be used for indication. 110 indicates that the symbols occupied by the first uplink control information in the M time resource units are all symbols that are used to transmit the uplink control information in each of first two time resource units, and some symbols that are used to transmit the uplink control information in the third time resource unit.

Therefore, the terminal device may directly determine, based on the first information, the symbols occupied by the first uplink control information in the M time resource units. This method is relatively simple and easy to implement, and can reduce signaling overheads.

Method 2:

The network device sends third information to the terminal device, where the third information is used to indicate, for the terminal device, a start location and/or an end location of the symbol that is occupied by the first uplink control information in each of the M time resource units, so that the terminal device determines the symbols that are occupied by the first uplink control information in the M time resource units.

The terminal device receives the third information sent by the network device, and the terminal device determines, based on the third information, the symbols occupied by the first uplink control information in the M time resource units.

In some embodiments, the third information indicates the start location of the symbol that is occupied by the first uplink control information in each of the M time resource units. The end location of the symbol that is occupied by the first uplink control information in each time resource unit is considered by default an end symbol that is used to transmit the uplink control information in each time resource unit.

In some embodiments, the third information indicates the end location of the symbol that is occupied by the first uplink control information in each of the M time resource units. The start location of the symbol that is occupied by the first uplink control information in each time resource unit is considered by default a start symbol that is used to transmit the uplink control information in each time resource unit.

In some embodiments, the third information indicates the start location and the end location of the symbol that is occupied by the first uplink control information in each of the M time resource units.

Similar to method 1, when a downlink data receiving state (for example, ACK/NACK) is fed back, the third information is indicated in corresponding DCI used for feeding back a downlink data receiving state, or is indicated in corresponding DCI used for triggering feedback, or is indicated in half-static signaling such as RRC.

For example, in an aperiodic signal condition such as triggered CSI feedback or SR, the third information is indicated in corresponding DCI used for triggering.

For example, in the periodic signal condition such as the periodic CSI feedback or the SR, the third information is indicated in the half-static signaling.

Therefore, the terminal device may indirectly determine, based on the third information, the symbols occupied by the third uplink control information in the M time resource units. This method is relatively simple and easy to implement.

For the foregoing method 1 and method 2, in some embodiments, before the network device sends the first information or the third information to the terminal device, the network device determines, based on the quantity of symbols that need to be occupied by the first uplink control information and the quantity of symbols that are used to transmit the uplink control information in each of the N time resource units, the symbols occupied by the first uplink control information in the M time resource units.

Method 3:

The network device sends second information to the terminal device, where the second information is used to indicate a quantity of symbols that need to be occupied to transmit the first uplink control information, so that the terminal device determines the symbols that are occupied by the first uplink control information in the M time resource units.

The terminal device receives the second information sent by the network device. The terminal device determines, based on the quantity of symbols that need to be occupied to transmit the first uplink control information and the quantity of symbols that are used to transmit the uplink control information in each of the N time resource units, the symbols occupied by the first uplink control information in the M time resource units.

Similar to method 1 and method 2, when a downlink data receiving state (for example, ACK/NACK) is fed back, the second information is indicated in corresponding DCI used for feeding back a downlink data receiving state, or is indicated in corresponding DCI used for triggering feedback, or is indicated in half-static signaling such as RRC.

For example, in an aperiodic signal condition such as triggered CSI feedback or SR, the second information is indicated in corresponding DCI used for triggering.

For example, in the periodic signal condition such as the periodic CSI feedback or the SR, the second information is indicated in the half-static signaling.

Therefore, the terminal device may indirectly determine, based on the second information, the symbols occupied by the second uplink control information in the M time resource units.

Method 4:

The terminal device determines, based on the quantity of symbols that need to be occupied by the first uplink control information and the quantity of symbols that are used to transmit the uplink control information in each of the N time resource units, the symbols occupied by the first uplink control information in the M time resource units.

In this case, the terminal device does not need to determine, based on a message of the network device, the symbols occupied by the first uplink control information in the M time resource units, and the quantity of symbols that need to be occupied to transmit the first uplink control information may be specified by using a protocol or may be specified by a sender and a receiver.

For the foregoing method 3 and method 4, when the M time resource units include a frequency hopping point of only one physical uplink control channel, and M=1, the terminal device may use the following method to determine, based on the quantity of symbols that need to be occupied to transmit the first uplink control information and the quantity of symbols that are used to transmit the uplink control information in each of the N time resource units, the symbols occupied by the first uplink control information in the M time resource units:

if a first value is less than or equal to a target value, the terminal device determines to occupy X symbols that are used to transmit the uplink control information in the M time resource units to transmit the first uplink control information; or if the first value is greater than the target value, the terminal device determines to occupy all symbols that are used to transmit the uplink control information in the M time resource units to transmit the first uplink control information; where the first value and the target value are determined based on the quantity of symbols that need to be occupied to transmit the first uplink control information and the quantity of symbols that are used to transmit the uplink control information in each of the N time resource units, and X is a quantity of symbols starting from a start symbol that is used to transmit the uplink control information in the M time resource units, and ending with the last symbol before a frequency hopping point of the physical uplink control channel in the M time resource units, or X is a quantity of symbols starting from the first symbol after the frequency hopping point of the physical uplink control channel in the M time resource units, and ending with an end symbol that is used to transmit the uplink control information in the M time resource units.

In some embodiments, the first value is a difference between the quantity of symbols that need to be occupied to transmit the first uplink control information and a total quantity of symbols that are used to transmit the uplink control information in the N–M time resource units, and the total quantity of symbols that are used to transmit the uplink control information in the N–M time resource units is determined by the terminal device based on a quantity of symbols that are used to transmit the uplink control information in each of the N–M time resource units.

In some embodiments, the target value is less than or equal to X.

It should be understood that for the foregoing method 1 and method 2, the method used by the network device to determine, based on the quantity of symbols that need to be occupied to transmit the first uplink control information and the quantity of symbols that are used to transmit the uplink control information in each of the N time resource units, the symbols occupied by the first uplink control information in the M time resource units is the same as the method used by the foregoing terminal device to determine, based on the quantity of symbols that need to be occupied to transmit the first uplink control information and the quantity of symbols that are used to transmit the uplink control information in each of the N time resource units, the symbols occupied by the first uplink control information in the M time resource units. No repeated description is provided.

The following describes, with reference to specific application scenarios, a process in which the terminal device transmits the uplink control information.

It should be noted that the method used by the terminal device to determine the symbols occupied by the first uplink control information in the M time resource units is the same as the method used by the network device to determine the symbols occupied by the first uplink control information in the M time resource units. No repeated description is provided.

When the M time resource units include a frequency hopping point of only one physical uplink control channel, and M=1, with reference to different locations of the time resource unit in N time resources, the following scenario 1, scenario 2, and scenario 3 are respectively used for description.

Scenario 1:

It is assumed that the terminal device occupies the N time resource units to transmit the first uplink control information, all symbols that are used to transmit the uplink control information in each of first N–1 time resource units are occupied, and the $N^{th}$ time resource unit includes a frequency hopping point of one physical uplink control channel.

If the first value is less than or equal to the target value, the terminal device determines to occupy X symbols that are used to transmit the uplink control information in the $N^{th}$ time resource unit to transmit the first uplink control information; or if the first value is greater than the target value, the terminal device determines to occupy all symbols that are used to transmit the uplink control information in the $N^{th}$ time resource unit to transmit the first uplink control information.

In some embodiments, the first value is a difference between the quantity of symbols that need to be occupied to transmit the first uplink control information and a total quantity of symbols that are used to transmit the uplink control information in the first N−1 time resource units. The target value is less than or equal to X.

In some embodiments, X is a quantity of symbols starting from a start symbol that is used to transmit the uplink control information in the $N^{th}$ time resource unit, and ending with the last symbol before a frequency hopping point of the physical uplink control channel in the $N^{th}$ time resource unit; or X is a quantity of symbols starting from the first symbol after the frequency hopping point of the physical uplink control channel in the $N^{th}$ time resource unit, and ending with an end symbol that is used to transmit the uplink control information in the $N^{th}$ time resource unit. That is, X is a quantity of symbols on a frequency hopping leg/frequency hopping part.

In some embodiments, when the $M^{th}$ time resource unit is the $N^{th}$ time resource unit in the N time resource units, X is the quantity of symbols starting from the start symbol that is used to transmit the uplink control information in the $N^{th}$ time resource unit, and ending with the last symbol before the frequency hopping point of the physical uplink control channel in the $N^{th}$ time resource unit.

Figure 6:
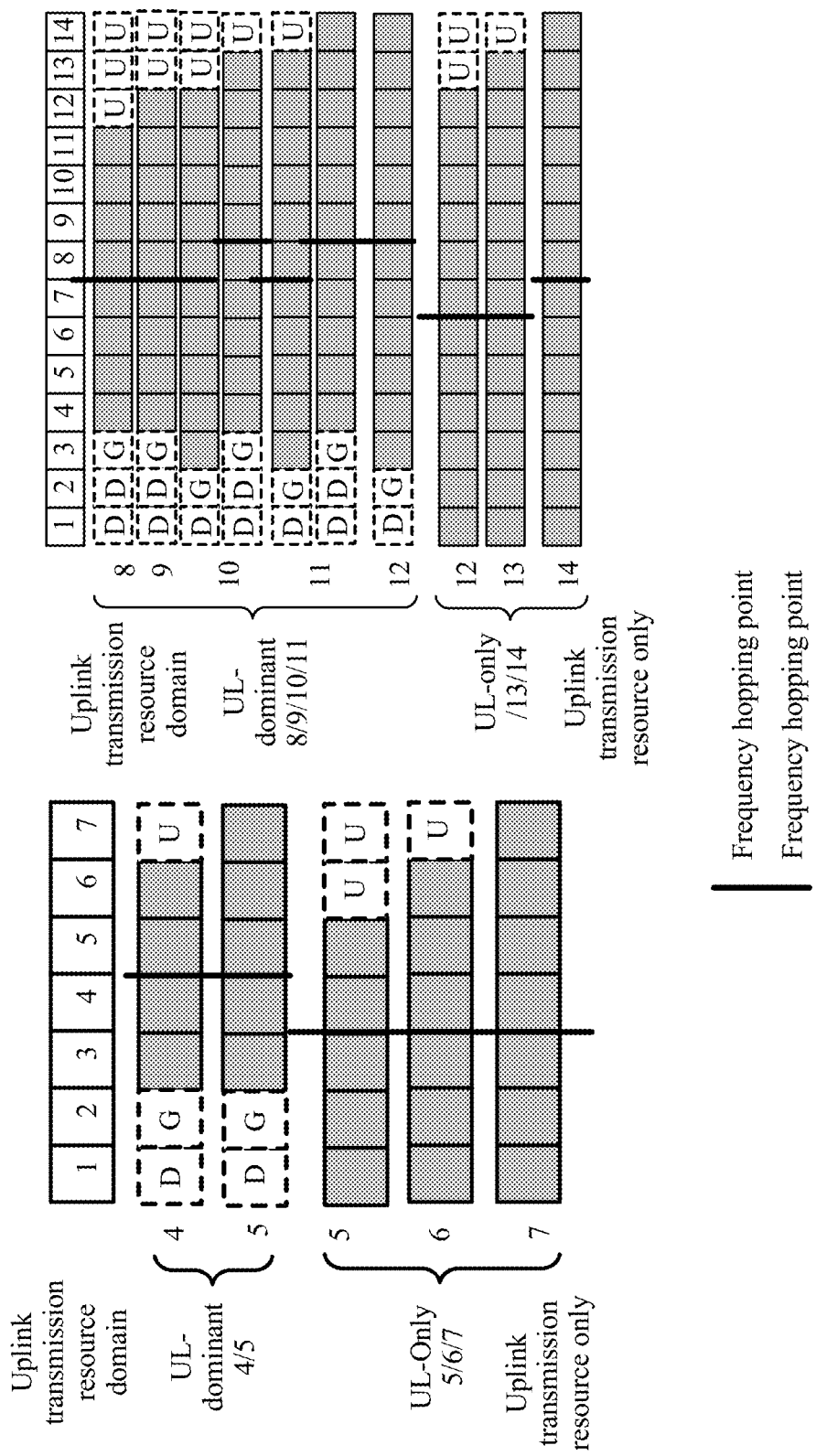
FIG. 6 is a schematic diagram of frequency hopping point configuration in various time resource units, in accordance with one or more embodiments.

For example, as shown in FIG. 6, FIG. 6 shows a location of a frequency hopping point. It is assumed that a quantity of symbols of the long PUCCH in the slot is L, and therefore, X is a rounded-up value or a rounded-down value of L/2. A specific value of X depends on the location of the frequency hopping point. For example, in a long PUCCH with a length of four symbols, X=2; and in a long PUCCH with a length of five symbols, X=2 or X=3. Certainly, the frequency hopping point may be at another location, for example, L=6, the frequency hopping point is located between the second symbol and the third symbol, that is, X=2.

Figure 7:
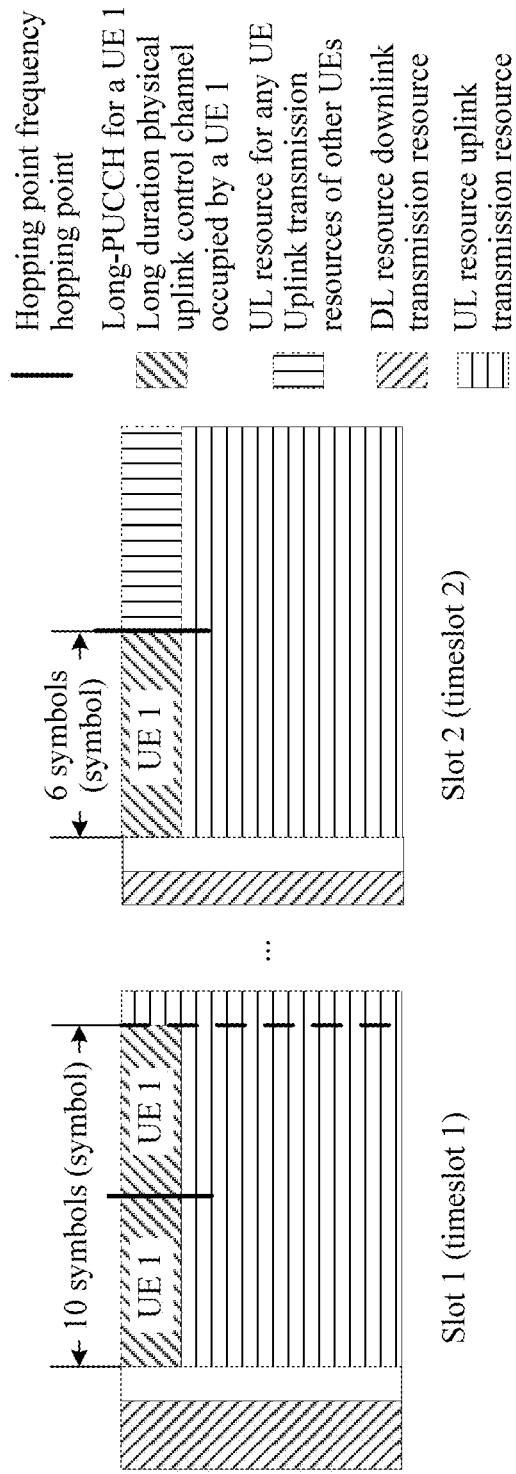
FIG. 7 is a third schematic diagram of N time resource units occupied by first uplink control information for transmission, in accordance with one or more embodiments.

In an optional embodiment, as shown in FIG. 7, it is assumed that a UE 1 occupies two timeslots to transmit the first uplink control information, and actually, the first uplink control information needs to occupy only 14 symbols (it is assumed that the subcarrier spacing is 15 kHz). The slot 1 includes 10 symbols used to transmit the uplink control information, and the slot 2 includes 12 symbols used to transmit the uplink control information. The slot 2 includes a frequency hopping point of one long PUCCH.

When all the 10 symbols used to transmit the uplink control information in the slot 1 are occupied, the UE 1 further needs to determine symbols that are occupied in the slot 2 to transmit the first control information. It is assumed that the first value is 4, 14−10=4, and therefore, the quantity of symbols that are used to transmit the uplink control information and that the UE 1 further needs to occupy in the slot 2 is 4. It is assumed that the target value is equal to X, and the frequency hopping point of the long PUCCH in the slot 2 is at a middle location of the symbols used to transmit the uplink control information. X=12/2=6, and therefore, the UE 1 determines that 4<6, and a quantity of symbols that are occupied to transmit the first control information in the slot 2 is 6. The 6 symbols do not support frequency hopping, and may support time domain OCC (or may not support the time domain OCC).

Therefore, the first uplink control information occupies 10 symbols used to transmit the uplink control information in the slot 1 and 6 symbols used to transmit the uplink control information in the slot 2. In this case, only resources of two symbols are wasted. However, in the slot 2, the physical uplink control channel resource may support multiplexing with other UEs without changing an original internal uplink control channel format of a slot.

Figure 8:
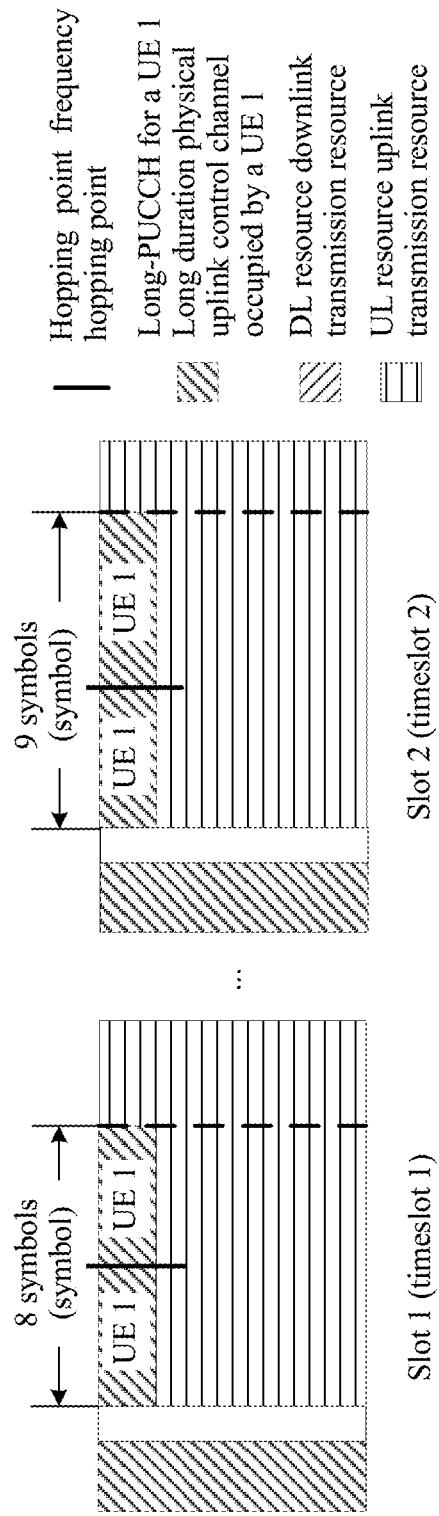
FIG. 8 is a fourth schematic diagram of N time resource units occupied by first uplink control information for transmission, in accordance with one or more embodiments.

In an optional embodiment, as shown in FIG. 8, it is assumed that the UE 1 occupies two slots to transmit the first uplink control information, and actually, only 14 symbols (it is assumed that the subcarrier spacing is 15 kHz) need to be occupied to transmit the first uplink control information. The slot 1 includes 8 symbols used to transmit the uplink control information, and the slot 2 includes 9 symbols used to transmit the uplink control information. The slot 2 includes a frequency hopping point of one long PUCCH.

When all the 8 symbols used to transmit the uplink control information in the slot 1 are occupied, the UE 1 further needs to determine the symbols that are occupied in the slot 2 to transmit the first control information. It is assumed that the first value is 6, 14−8=6, and therefore, the quantity of symbols that are used to transmit the uplink control information and that the UE 1 further needs to occupy in the slot 2 is 6. It is assumed that the target value is equal to X, and the frequency hopping point of the long PUCCH in the slot 2 is at the middle location of the symbols used to transmit the uplink control information. X=4, 9/2 is rounded down, and therefore, the UE 1 determines that 6>4, and the quantity of symbols that are occupied to transmit the first control information in the slot 2 is 9. Frequency hopping is performed on the 9 symbols according to a long PUCCH rule in the slot 2 (or the frequency hopping is not performed), and the 9 symbols may support the time domain OCC (or may not support the time domain OCC).

Therefore, the first uplink control information occupies 8 symbols used to transmit the uplink control information in the slot 1 and 9 symbols used to transmit the uplink control information in the slot 2. Only resources of three symbols are wasted. However, in the slot 2, the physical uplink control channel resource may support multiplexing with other UEs without changing an original internal uplink control channel format of a slot.

Therefore, resource waste can be effectively reduced by using the foregoing method, thereby improving resource utilization. In addition, the physical uplink control channel resource may support multiplexing with other UEs without changing an original internal uplink control channel format of a slot.

Scenario 2:

It is assumed that the terminal device occupies the N time resource units to transmit the first uplink control information. The first time resource unit includes a frequency hopping point of one physical uplink control channel, and all symbols that are used to transmit the uplink control information in each of last N−1 time resource units are occupied.

If the first value is less than or equal to the target value, the terminal device determines to occupy X symbols that are used to transmit the uplink control information in the first time resource unit to transmit the first uplink control information; or if the first value is greater than the target value, the terminal device determines to occupy all symbols that are used to transmit the uplink control information in the first time resource unit to transmit the first uplink control information.

In some embodiments, the first value is a difference between the quantity of symbols that need to be occupied to transmit the first uplink control information and a total quantity of symbols that are used to transmit the uplink control information in the last N−1 time resource units. The target value is less than or equal to X.

In some embodiments, X is a quantity of symbols starting from a start symbol that is used to transmit the uplink control information in the first time resource unit, and ending with the last symbol before a frequency hopping point of the physical uplink control channel in the first time resource unit; or X is a quantity of symbols starting from the first symbol after the frequency hopping point of the physical uplink control channel in the first time resource unit, and ending with an end symbol that is used to transmit the uplink control information in the first time resource unit.

In some embodiments, when the $M^{th}$ time resource unit is the first time resource unit in the N time resource units, X is the quantity of symbols starting from the first symbol after the frequency hopping point of the physical uplink control channel in the first time resource unit, and ending with the last symbol that is used to transmit the uplink control information in the first time resource unit.

Figure 9:
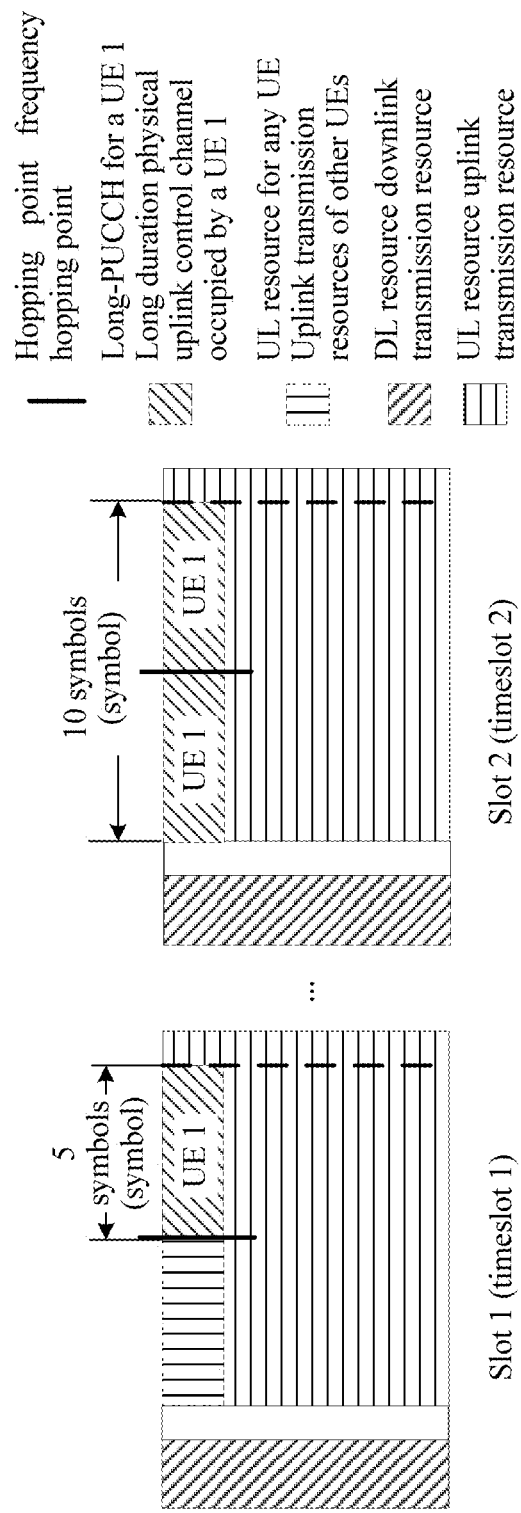
FIG. 9 is a fifth schematic diagram of N time resource units occupied by first uplink control information for transmission, in accordance with one or more embodiments.

In an optional embodiment, as shown in FIG. 9, it is assumed that the UE 1 occupies two slots to transmit the first uplink control information, and actually, only 14 symbols (it is assumed that the subcarrier spacing is 15 kHz) need to be occupied to transmit the first uplink control information. The slot 1 includes 10 symbols used to transmit the uplink control information, and the slot 2 includes 10 symbols used to transmit the uplink control information. The slot 1 includes a frequency hopping point of one long PUCCH.

When all the 10 symbols used to transmit the uplink control information in the slot 2 are occupied, the UE 1 further needs to determine symbols that are occupied in the slot 1 to transmit the first control information. It is assumed that the first value is 4, 14−10=4, and therefore, the quantity of symbols that are used to transmit the uplink control information and that the UE 1 further needs to occupy in the slot 1 is 4. It is assumed that the target value is equal to X, and the frequency hopping point of the long PUCCH in the slot 1 is at a middle location of the symbols used to transmit the uplink control information. X=10/2=5, and therefore, the UE 1 determines that 4<5, and the quantity of symbols that are occupied to transmit the first control information in the slot 1 is 5. The 5 symbols do not support the frequency hopping, and may support the time domain OCC (or may not support the time domain OCC).

Therefore, the first uplink control information occupies 10 symbols used to transmit the uplink control information in the slot 2 and 5 symbols used to transmit the uplink control information in the slot 1. In this case, only resources of one symbol are wasted. However, in the slot 1, the physical uplink control channel resource may support multiplexing with other UEs without changing an original internal uplink control channel format of a slot.

In an optional embodiment, as shown in FIG. 8, it is assumed that the UE 1 occupies two slots to transmit the first uplink control information, and actually, only 14 symbols (it is assumed that the subcarrier spacing is 15 kHz) need to be occupied to transmit the first uplink control information. The slot 1 includes 8 symbols used to transmit the uplink control information, and the slot 2 includes 9 symbols used to transmit the uplink control information. The slot 1 includes a frequency hopping point of one long PUCCH.

When all the 9 symbols used to transmit the uplink control information in the slot 2 are occupied, the UE 1 further needs to determine symbols that are occupied in the slot 1 to transmit the first control information. It is assumed that the first value is 5, 14−9=5, and therefore, the quantity of symbols that are used to transmit the uplink control information and that the UE 1 further needs to occupy in the slot 1 is 5. It is assumed that the target value is equal to X, and the frequency hopping point of the long PUCCH in the slot 1 is at the middle location of the symbols used to transmit the uplink control information. X=4, and therefore, the UE 1 determines that 5>4, and the quantity of symbols that are occupied to transmit the first control information in the slot 1 is 8. Frequency hopping is performed on the 8 symbols according to the long PUCCH rule in the slot 2 (or the frequency hopping is not performed), and the 8 symbols may support the time domain OCC (or may not support the time domain OCC).

Therefore, the first uplink control information occupies 8 symbols used to transmit the uplink control information in the slot 1 and 9 symbols used to transmit the uplink control information in the slot 2. Only resources of three symbols are wasted. However, in the slot 2, the physical uplink control channel resource may support multiplexing with other UEs without changing an original internal uplink control channel format of a slot.

Figure 10:
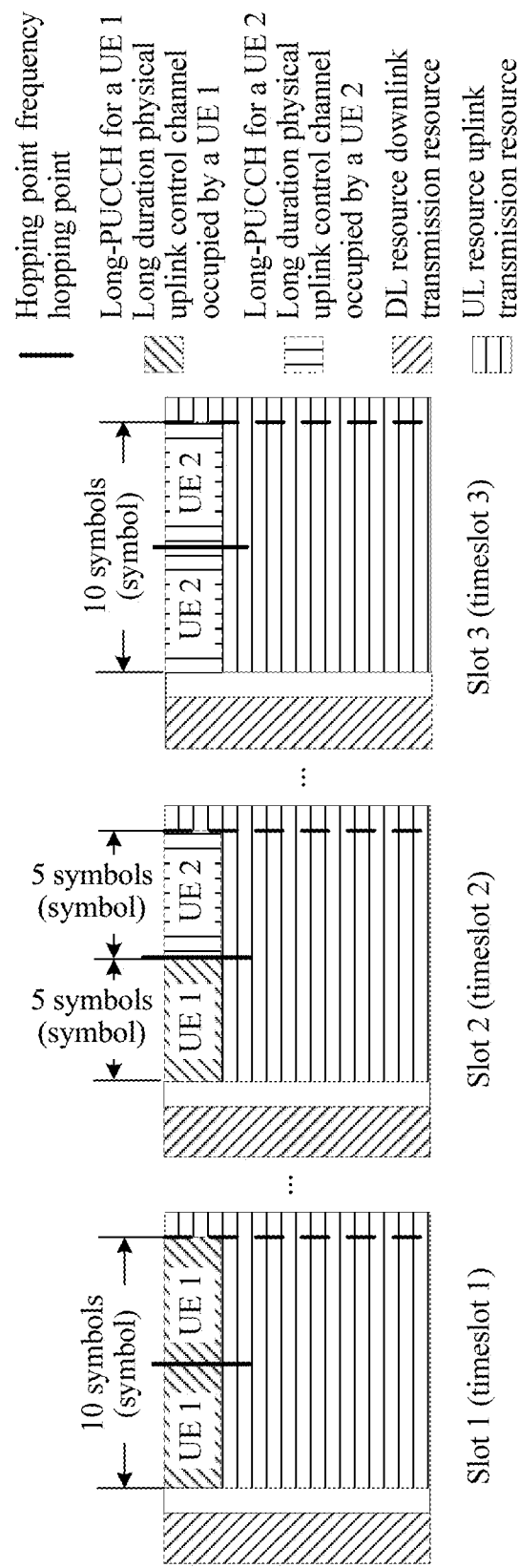
FIG. 10 is a schematic diagram of time resource units occupied by a first user equipment (UE 1) to transmit first uplink control information and occupied by a second user equipment (UE 2) to transmit second uplink control information, in accordance with one or more embodiments.

Particularly, as shown in FIG. 10, the slot 1 includes 10 symbols used to transmit the uplink control information, the slot 2 includes 10 symbols used to transmit the uplink control information, and the slot 3 includes 10 symbols used to transmit the uplink control information. The UE 1 transmits the first uplink control information, and the UE 2 transmits the second uplink control information. The first uplink control information occupies 10 symbols used to transmit the uplink control information in the slot 1 and 5 symbols used to transmit the uplink control information in slot 2; and the second uplink control information occupies 5 symbols used to transmit the uplink control information in the slot 2 and 10 symbols used to transmit the uplink control information in the slot 3. Therefore, scenario 1 and scenario 2 may be combined to effectively improve resource utilization and reduce resource waste.

Scenario 3:

It is assumed that the terminal device occupies the N time resource units to transmit the first uplink control information. The time resource unit includes a frequency hopping point of one physical uplink control channel, and all symbols that are used to transmit the uplink control information in each of remaining N−1 time resource units are occupied.

Figure 11:
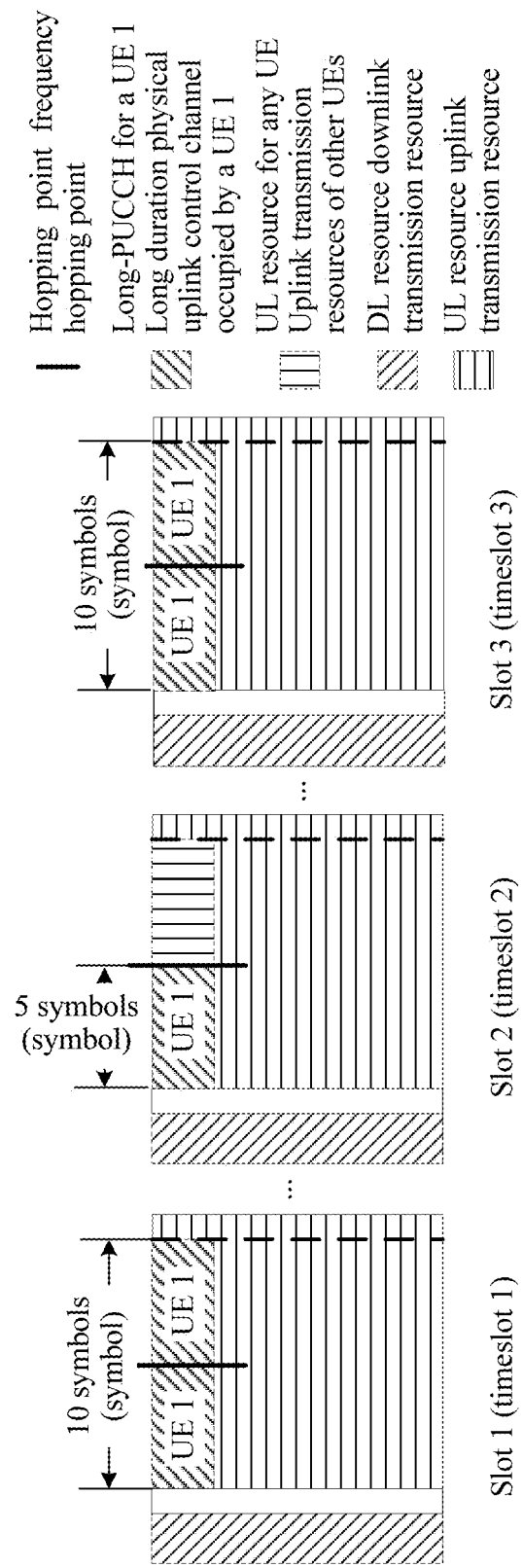
FIG. 11 is a schematic diagram of N time resource units occupied by first uplink control information for transmission, in accordance with one or more embodiments.

In an optional embodiment, as shown in FIG. 11, it is assumed that the UE 1 occupies three slots to transmit the first uplink control information, and actually, only 24 symbols need to be occupied to transmit the first uplink control information. The slot 1 includes 10 symbols used to transmit the uplink control information, the slot 2 includes 10 symbols used to transmit the uplink control information, the third slot includes 10 symbols used to transmit the uplink control information, and the slot 2 includes a frequency hopping point of one long PUCCH.

When all the 10 symbols used to transmit the uplink control information in the slot 1 and the third slot are occupied, the UE 1 further needs to determine the symbols that are occupied in the slot 2 to transmit the first control information. It is assumed that the first value is 4, 24−20=4 (that is, the first value is a difference between the quantity of symbols that need to be occupied by the first uplink control information and a total quantity of symbols that are used to transmit the uplink control information in the slot 1 and the third slot), and therefore, the quantity of symbols that are used to transmit the uplink control information and that the UE 1 further needs to occupy in the slot 2 is 4. It is assumed that the target value is equal to X, and the frequency hopping point of the long PUCCH in the slot 2 is at the middle location of the symbols used to transmit the uplink control information. X=10/2=5, and therefore, the UE 1 determines that 4<5, and the quantity of symbols that are occupied to transmit the first control information in the slot 2 is 5. The 5 symbols do not support the frequency hopping, and may support the time domain OCC (or may not support the time domain OCC).

Therefore, the first uplink control information occupies 10 symbols used to transmit the uplink control information in the slot 1, occupies 5 symbols used to transmit the uplink control information in the slot 2, occupies 10 symbols used to transmit the uplink control information in the third slot, and only resources of one symbol are wasted. However, in the slot 2, the physical uplink control channel resource may support multiplexing with other UEs without changing an original internal uplink control channel format of a slot.

Figure 12:
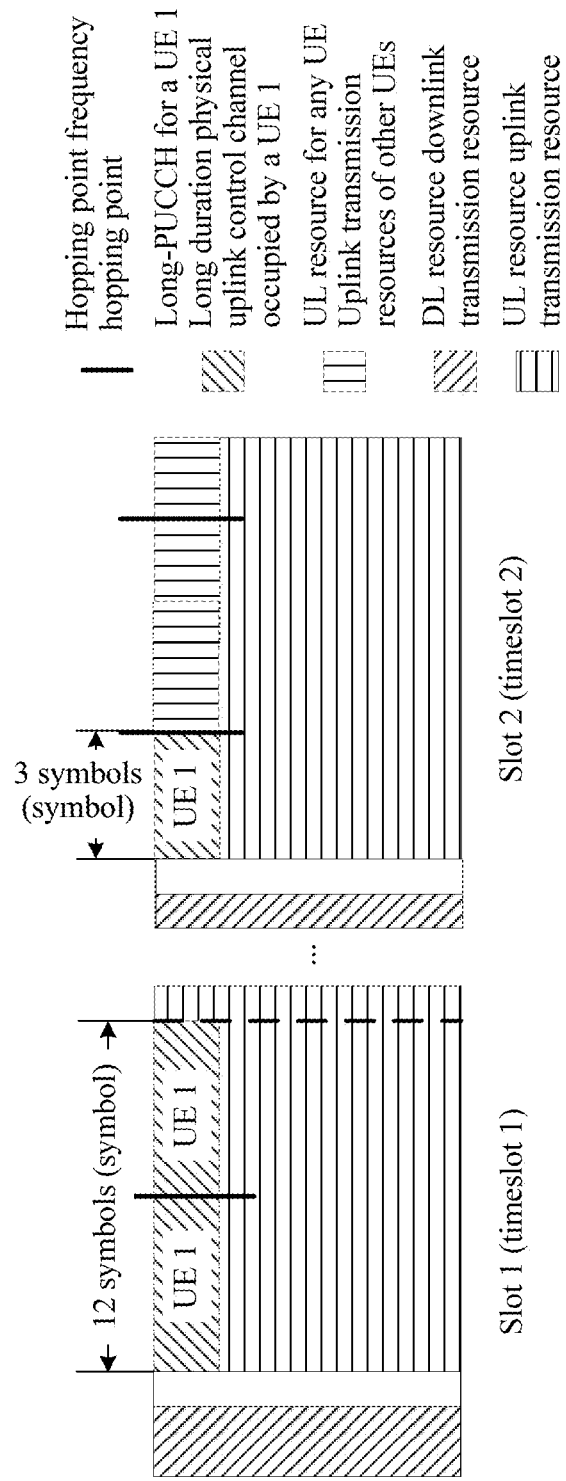
FIG. 12 is a schematic diagram of N time resource units occupied by first uplink control information for transmission, in accordance with one or more embodiments.

In an optional embodiment, as shown in FIG. 12, it is assumed that the UE 1 occupies three slots to transmit the first uplink control information, and actually, only 28 symbols need to be occupied to transmit the first uplink control information. The slot 1 includes 10 symbols used to transmit the uplink control information, the slot 2 includes 10 symbols used to transmit the uplink control information, the third slot includes 10 symbols used to transmit the uplink control information, and the slot 2 includes a frequency hopping point of one long PUCCH.

When all the 10 symbols used to transmit the uplink control information in the slot 1 and the third slot are occupied, the UE 1 further needs to determine the symbols that are occupied in the slot 2 to transmit the first control information. It is assumed that the first value is 8, 28−20=8 (that is, the first value is the difference between the quantity of symbols that need to be occupied by the first uplink control information and the total quantity of symbols that are used to transmit the uplink control information in the slot 1 and the third slot), and therefore, the quantity of symbols that are used to transmit the uplink control information and that the UE 1 further needs to occupy in the slot 2 is 8. It is assumed that the target value is equal to X, and the frequency hopping point of the long PUCCH in the slot 2 is at the middle location of the symbols used to transmit the uplink control information. X=10/2=5, and therefore, the UE 1 determines that 8>5, and the quantity of symbols that are occupied to transmit the first control information in the slot 2 is 10. Frequency hopping is performed on the 10 symbols according to the long PUCCH rule in the slot 2 (or the frequency hopping is not performed), and the 10 symbols may support the time domain OCC (or may not support the time domain OCC).

Therefore, the first uplink control information occupies 10 symbols used to transmit the uplink control information in the slot 1, occupies 10 symbols used to transmit the uplink control information in the slot 2, occupies 10 symbols used to transmit the uplink control information in the third slot, and only resources of two symbols are wasted. However, in the slot 2, the physical uplink control channel resource may support multiplexing with other UEs without changing an original internal uplink control channel format of a slot.

Scenario 4:

When M>1, it is assumed that the terminal device occupies the N time resource units to transmit the first uplink control information, where the first uplink control information occupies some or all symbols that are used to transmit the uplink control information in each of the M time resource units, and occupies all symbols that are used to transmit the uplink control information in each of N−M time resource units other than the M time resource units.

In an optional embodiment, as shown in FIG. 4, the UE 1 occupies three slots to transmit the first uplink control information. Slot 1 includes 10 symbols used to transmit the uplink control information, the slot 2 includes 10 symbols used to transmit the uplink control information, the slot 3 includes 10 symbols used to transmit the uplink control information, and each of the slot 1 to the slot 3 respectively includes a frequency hopping point of one physical uplink control channel. It is assumed that the quantity of symbols that need to be occupied to transmit the first uplink control information is 18, and therefore, a base station sends first information or third information to the terminal, and instructs the first uplink control information to occupy symbols from the first symbol after the frequency hopping point of the physical uplink control channel in the slot 1 to the end symbol used to transmit the uplink control information, occupy all symbols used to transmit the uplink control information in the slot 2, and occupy symbols from a start symbol that is used to transmit the uplink control information in the slot 3 to the last symbol before the frequency hopping point of the physical uplink control channel.

Alternatively, the base station sends the first information or the third information to the terminal, and instructs the first uplink control information to occupy symbols from the first symbol after the frequency hopping point of the physical uplink control channel in the slot 1 to the end symbol used to transmit the uplink control information, and occupy symbols from the start symbol that is used to transmit the uplink control information in the slot 3 to the last symbol before the frequency hopping point of the physical uplink control channel. All symbols that are used to transmit the uplink control information in the slot 2 are occupied by default.

Alternatively, the base station sends the second information to the terminal, and the terminal determines, through calculation according to a rule determined by a sender and a receiver, that the first uplink control information occupies the symbols from the first symbol after the frequency hopping point of the physical uplink control channel in the slot 1 to the end symbol used to transmit the uplink control information, occupies all the symbols used to transmit the uplink control information in the slot 2, and occupies symbols from the start symbol that is used to transmit the uplink control information in the slot 3 to the last symbol before the frequency hopping point of the physical uplink control channel.

Therefore, the first uplink control information occupies 5 symbols used to transmit the uplink control information in the slot 1, occupies 10 symbols used to transmit the uplink control information in the slot 2, occupies 5 symbols used to transmit the uplink control information in the slot 3, and only resources of two symbols are wasted. However, in the slot 1, the slot 2, and the slot 3, the physical uplink control channel resource may support multiplexing with other UEs without changing an original internal uplink control channel format of a slot.

Scenario 5:

It is assumed that the terminal device occupies the N time resource units to transmit the first uplink control information, the first uplink control information occupies some or all symbols that are used to transmit the uplink control information in each of the M time resource units, and occupies all symbols that are used to transmit the uplink control information in each of N−M time resource units other than the M time resource units. The $i^{th}$ time resource unit in the M time resource units includes frequency hopping points of at least two physical uplink control channels.

In an optional embodiment, as shown in FIG. 12, the UE 1 occupies two slots to transmit the first uplink control information. The slot 1 includes 12 symbols used to transmit the uplink control information, the slot 2 includes 10 symbols used to transmit the uplink control information, and the slot 2 includes two frequency hopping points of physical uplink control channels. The PUCCH1 occupies the symbol 5 to the symbol 10, including one frequency hopping point between the symbol 7 and the symbol 8. The PUCCH2 occupies the symbol 11 to the symbol 14, including another frequency hopping point between the symbol 12 and the symbol 13. A timeslot structure of the slot 2 is shown in FIG. 1.

It is assumed that the quantity of symbols that need to be occupied to transmit the first uplink control information is 14.

When all the 12 symbols used to transmit the uplink control information in the slot 1 are occupied, the UE 1 further needs to determine the symbols that are occupied in the slot 2 to transmit the first control information. It is assumed that the first value is 2, 14−12=2, and therefore, the quantity of symbols that are used to transmit the uplink control information and that the UE 1 further needs to occupy in the slot 2 is 2. The UE 1 determines that there are three symbols from the start symbol that is used to transmit the uplink control information to the last symbol before the first frequency hopping point, and determines that 3 is the target value, and therefore, the UE 1 determines that 2<3, and the quantity of symbols that are occupied to transmit the first control information in the slot 2 is 3. The 3 symbols do not support the frequency hopping, and may support the time domain OCC (or may not support the time domain OCC).

Therefore, the first uplink control information occupies 12 symbols used to transmit the uplink control information in the slot 1 and 3 symbols used to transmit the uplink control information in the second slot. Only resources of one symbol are wasted. However, in the slot 2, the physical uplink control channel resource may support multiplexing with other UEs without changing an original internal uplink control channel format of a slot.

The symbols that are occupied by the first control information in the slot 2 may be the symbol 5 to the symbol 10, the symbol 5 to the symbol 12, the symbol 5 to the symbol 14, the symbol 8 to the symbol 10, the symbol 8 to the symbol 12, the symbol 8 to the symbol 14, the symbol 11 to the symbol 12, the symbol 11 to the symbol 14, the symbol 13 to the symbol 14, or the like. Simple extension may be performed based on the method in scenario 5, and details are not described in this application again.

Figure 13:
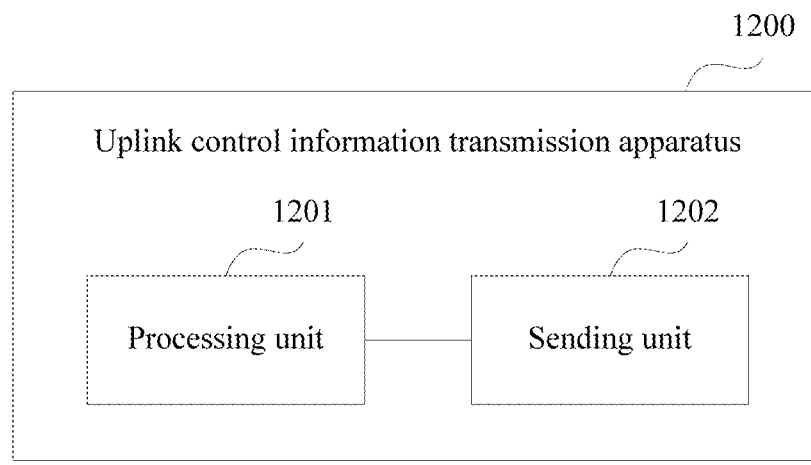
FIG. 13 is a first schematic diagram of an uplink control information transmission apparatus, in accordance with one or more embodiments.

Based on the foregoing embodiments, an embodiment of this application provides an uplink control information transmission apparatus, which is corresponding to a terminal device, and is configured to implement the method shown in FIG. 3. Referring to FIG. 13, the uplink control information transmission apparatus 1300 includes a processing unit 1301 and a sending unit 1302.

The processing unit 1301 is configured to determine symbols occupied by first uplink control information in M time resource units.

The sending unit 1302 is configured to transmit the first uplink control information based on the symbols occupied by the first uplink control information in the M time resource units, where the first uplink control information occupies some or all symbols that are used to transmit uplink control information in each of the M time resource units, and occupies all symbols that are used to transmit the uplink control information in each of N−M time resource units other than the M time resource units.

The first uplink control information is carried on a physical uplink control channel, the M time resource units are time resource units in N time resource units, N≥2, M≥1, and both N and M are positive integers.

For details, refer to the method embodiment shown in FIG. 3, and details are not described in this application again.

Figure 14:
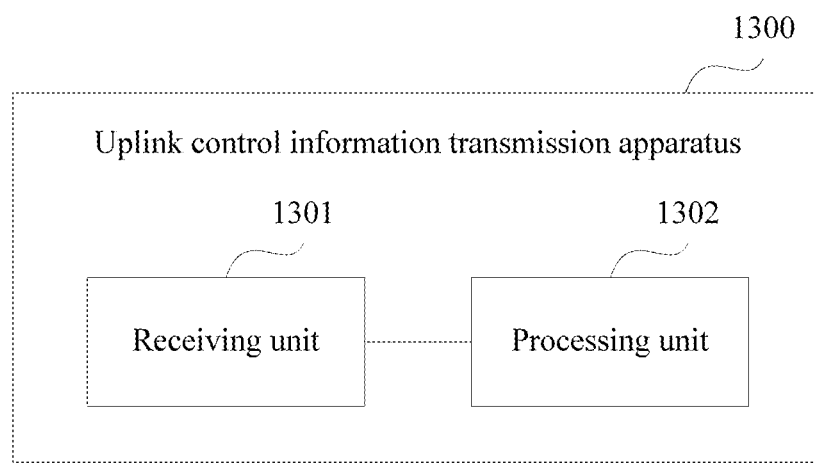
FIG. 14 is a second schematic diagram of an uplink control information transmission apparatus, in accordance with one or more embodiments.

Based on the foregoing embodiments, an embodiment of this application provides an uplink control information transmission apparatus, which is corresponding to a network device, and is configured to implement the method shown in FIG. 3. Referring to FIG. 14, the uplink control information transmission apparatus 1400 includes a receiving unit 1401 and a processing unit 1402.

The receiving unit 1401 is configured to receive first uplink control information sent by a terminal device, where the first uplink control information occupies some or all symbols that are used to transmit uplink control information in each of M time resource units, and occupies all symbols that are used to transmit the uplink control information in each of N−M time resource units other than the M time resource units.

The processing unit 1402 is configured to determine, based on the first uplink control information, a receiving result of downlink data of the terminal device, an uplink scheduling request, or a channel measurement result.

The first uplink control information is carried on a physical uplink control channel, the M time resource units are time resource units in N time resource units, N≥2, M≥1, and both N and M are positive integers.

For details, refer to the method embodiment shown in FIG. 3, and details are not described in this application again.

It should be understood that division of the foregoing units is merely logical function division. All or some of the units may be integrated into a physical entity in actual implementation, or may be physically separated. In addition, all the units may be implemented in a form of invocation by a processing element by using software; or all the units may be implemented in a hardware form; or some units are implemented in a form of invocation by a processing element by using software, and some units are implemented in a hardware form. For example, the processing unit may be an independently disposed processing element, or may be integrated into a chip for implementation. Alternatively, the processing unit may be stored in a memory in a form of a program, and a function of the unit is invoked and performed by a processing element. Implementation of other units is similar to this. In addition, all or some of the units may be integrated or may be implemented independently. The processing element herein may be an integrated circuit having a signal processing ability. In an implementation process, steps of the foregoing method or foregoing units may be completed by using an integrated logic circuit of hardware in the processing element or an instruction in a form of software in the processing element. In addition, the foregoing receiving unit is a receiving control unit, and may receive information by using a receiving apparatus of the terminal device or the network device, for example, an antenna or a radio frequency apparatus. The foregoing sending unit is a sending control unit, and may send information by using a sending apparatus of the terminal device or the network device, for example, an antenna or a radio frequency apparatus.

For example, the foregoing units may be disposed as one or more integrated circuits used for implementing the foregoing method, for example, one or more application-specific integrated circuits (ASIC), one or more digital signal processors (DSP), or one or more field programmable gate arrays (FPGA). For another example, when a foregoing unit is implemented in a form of scheduling a program by using a processing element, the processing element may be a general purpose processor, for example, a central processing unit (CPU) or another processor that can invoke the program. For another example, the units may be integrated for implementation in a form of a System-On-a-Chip (SOC).

Figure 15:
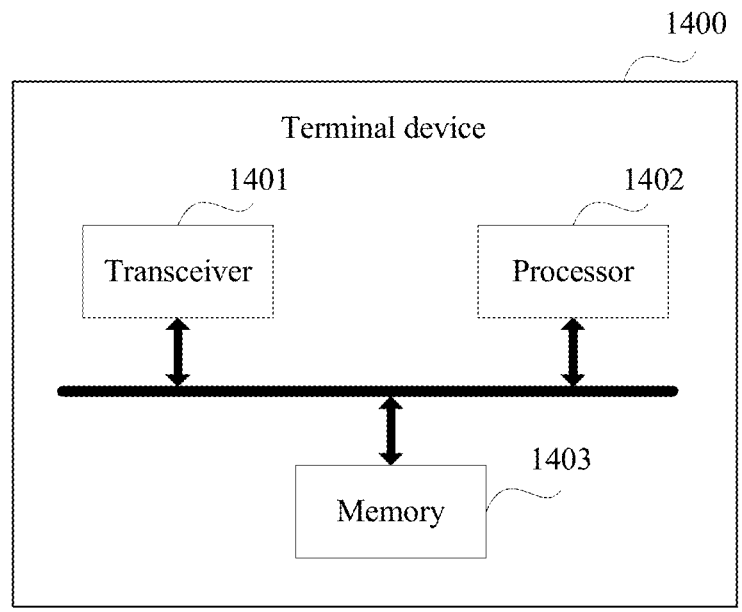
FIG. 15 is a schematic structural diagram of a terminal device, in accordance with one or more embodiments.

Based on the foregoing embodiments, an embodiment of this application further provides a terminal device, configured to implement the method shown in FIG. 3. Referring to FIG. 15, the terminal device 1500 includes a transceiver 1501, a processor 1502, and a memory 1503. A function of the sending unit 1302 in FIG. 13 is implemented by using the transceiver 1501, and a function of the processing unit 1301 is implemented by using the processor 1502.

The memory 1503 is configured to store a program, an instruction, and the like. The program may include program code, where the program code includes a computer operation instruction. The memory 1503 may include a RAM, and may also include a non-volatile memory, for example, at least one disk memory. The processor 1502 performs the application program stored in the memory 1503 to implement the foregoing function, so as to implement the method shown in FIG. 3.

For details, refer to the method embodiment shown in FIG. 3, and details are not described in this application again.

Figure 16:
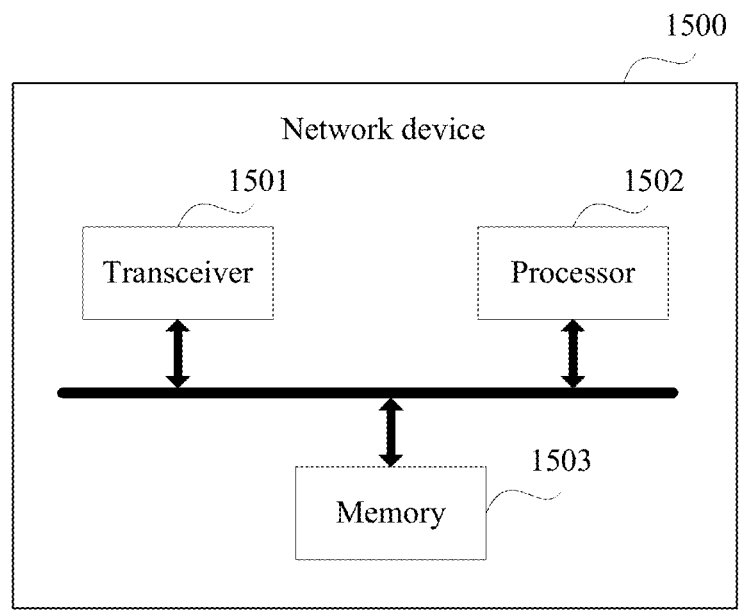
FIG. 16 is a schematic structural diagram of a network device, in accordance with one or more embodiments.

Based on the foregoing embodiments, an embodiment of this application further provides a network device, configured to implement the method shown in FIG. 3. Referring to FIG. 16, the terminal device 1600 includes a transceiver 1601, a processor 1602, and a memory 1603. The receiving unit 1401 is implemented by using the transceiver 1601, and a function of the processing unit 1402 is implemented by using the processor 1602.

The memory 1603 is configured to store a program, an instruction, and the like. The program may include program code, where the program code includes a computer operation instruction. The memory 1603 may include a random access memory (RAM), or may further include a non-volatile memory, for example, at least one disk memory. The processor 1602 performs the application program stored in the memory 1603 to implement the foregoing function, so as to implement the method shown in FIG. 3.

For details, refer to the method embodiment shown in FIG. 3, and details are not described in this application again.

In conclusion, this application provides an uplink control information transmission method and a device, so as to optimize the existing uplink control information transmission method. The method includes: determining, by a terminal device, symbols occupied by first uplink control information in M time resource units; and transmitting the first uplink control information based on the symbols occupied by the first uplink control information in the M time resource units, where the first uplink control information occupies some or all symbols that are used to transmit uplink control information in each of the M time resource units, and occupies all symbols that are used to transmit the uplink control information in each of N–M time resource units other than the M time resource units; where the M time resource units are time resource units in N time resource units. In this way, resource utilization is improved by using the method provided in this application, other terminal devices may multiplex physical uplink control channel resources, and neither frequency hopping nor time domain OCC needs to be re-designed.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, and an optical memory) that include computer usable program code.

The embodiments of this application are described with reference to the flowcharts and/or block diagrams of the method, the device, system, and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. An uplink control information transmission method, comprising:
   determining, by a terminal device, symbols occupied by first uplink control information in M time resource units, wherein the first uplink control information is carried on a physical uplink control channel; and
   transmitting, by the terminal device, the first uplink control information based on the symbols occupied by the first uplink control information in the M time resource units, wherein the first uplink control information occupies some or all symbols that are used to transmit uplink control information in each of the M time resource units, and occupies all symbols that are used to transmit the uplink control information in each of N−M time resource units other than the M time resource units,
   wherein
   the M time resource units are time resource units in N time resource units,
   N ≥ 2, M ≥ 1, and
   both N and M are positive integers.

2. The method according to claim 1, wherein:
   the symbols occupied by the first uplink control information in the M time resource units are all the symbols that are used to transmit the uplink control information in each of the M time resource units; or
   some symbols that are used to transmit the uplink control information in each of the M time resource units, or some symbols that are used to transmit the uplink control information in each of M1 time resource units and all symbols that are used to transmit the uplink control information in each of M2 time resource units, wherein M1+M2=M, where both M1 and M2 are positive integers.

3. The method according to claim 2, wherein some symbols that are used to transmit the uplink control information in the ith time resource unit start from a start symbol that is used to transmit the uplink control information in the ith time resource unit, and end with the last symbol before a frequency hopping point of any physical uplink control channel in the ith time resource unit; or
   some symbols that are used to transmit the uplink control information in the ith time resource unit start from the first symbol after a frequency hopping point of any physical uplink control channel in the ith time resource unit, and end with an end symbol that is used to transmit the uplink control information in the ith time resource unit; or
   some symbols that are used to transmit the uplink control information in the ith time resource unit start from the first symbol after a frequency hopping point of a first physical uplink control channel in the ith time resource unit, and end with the last symbol before a frequency hopping point of a second physical uplink control channel, and the ith time resource unit comprises frequency hopping points of at least two physical uplink control channels;
   the ith time resource unit is any one of the M time resource units.

4. The method according to claim 1, wherein the determining, by the terminal device, symbols occupied by first uplink control information in M time resource units comprises:
   receiving, by the terminal device, first information sent by a network device, wherein the first information is used to indicate the symbols occupied by the first uplink control information in the M time resource units; and
   determining, by the terminal device based on the first information, the symbols occupied by the first uplink control information in the M time resource units.

5. The method according to claim 1, wherein the determining, by the terminal device, symbols occupied by first uplink control information in M time resource units comprises:
   receiving, by the terminal device, second information sent by a network device, wherein the second information is used to indicate a quantity of symbols that need to be occupied to transmit the first uplink control information; and
   determining, by the terminal device based on the quantity of symbols that need to be occupied to transmit the first uplink control information and a quantity of symbols that are used to transmit the uplink control information in each of the N time resource units, the symbols occupied by the first uplink control information in the M time resource units.

6. The method according to claim 5, wherein:
   the M time resource units comprise a frequency hopping point of only one physical uplink control channel, and M=1; and
   the determining, by the terminal device based on the quantity of symbols that need to be occupied to transmit the first uplink control information and the quantity of symbols that are used to transmit the uplink control information in each of the N time resource units, the symbols occupied by the first uplink control information in the M time resource units comprises:
   if a first value is less than or equal to a target value, determining, by the terminal device, to occupy X symbols that are used to transmit the uplink control information in the M time resource units to transmit the first uplink control information; or
   if the first value is greater than the target value, determining, by the terminal device, to occupy all symbols that are used to transmit the uplink control information in the M time resource units to transmit the first uplink control information,
   wherein
   the first value and the target value are determined based on the quantity of symbols that need to be occupied to transmit the first uplink control information and the quantity of symbols that are used to transmit the uplink control information in each of the N time resource units, and
   X is a quantity of symbols starting from a start symbol that is used to transmit the uplink control information in the M time resource units, and ending with the last symbol before a frequency hopping point of the physical uplink control channel in the M time resource units, or
   X is a quantity of symbols starting from the first symbol after the frequency hopping point of the physical uplink control channel in the M time resource units, and ending with an end symbol that is used to transmit the uplink control information in the M time resource units.

7. The method according to claim 6, wherein the first value is a difference between the quantity of symbols that need to be occupied to transmit the first uplink control information and a total quantity of symbols that are used to transmit the uplink control information in the N−M time resource units, and the total quantity of symbols that are used to transmit the uplink control information in the N−M time resource units is determined by the terminal device based on a quantity of symbols that are used to transmit the uplink control information in each of the N−M time resource units.

8. The method according to claim 6, wherein the target value is less than or equal to X.

9. The method according to claim 1, wherein the determining, by the terminal device, symbols occupied by first uplink control information in M time resource units comprises:
receiving, by the terminal device, third information sent by a network device, wherein the third information is used to indicate one or more of a start location or an end location of the symbol that is occupied by the first uplink control information in each of the M time resource units; and
determining, by the terminal device based on the third information, the symbols occupied by the first uplink control information in the M time resource units.

10. The method according to claim 1, wherein the time resource unit is any one of a subframe, a timeslot, a mini-slot, and an orthogonal frequency division multiplexing OFDM symbol.

11. The method according to claim 1, wherein the physical uplink control channel is a long duration physical uplink control channel.

12. An uplink control information transmission method, comprising:
receiving, by a network device, first uplink control information sent by a terminal device, wherein the first uplink control information occupies some or all symbols that are used to transmit uplink control information in each of M time resource units, and occupies all symbols that are used to transmit the uplink control information in each of N−M time resource units other than the M time resource units; and
determining, by the network device based on the first uplink control information, a receiving result of downlink data of the terminal device, an uplink scheduling request, or a channel measurement result,
wherein
the first uplink control information is carried on a physical uplink control channel,
the M time resource units are time resource units in N time resource units,
N≥ 2, M≥ 1, and
both N and M are positive integers.

13. The method according to claim 12, wherein:
some symbols that are used to transmit the uplink control information in the ith time resource unit start from a start symbol that is used to transmit the uplink control information in the ith time resource unit, and end with the last symbol before a frequency hopping point of any physical uplink control channel in the ith time resource unit;
some symbols that are used to transmit the uplink control information in the ith time resource unit start from the first symbol after a frequency hopping point of any physical uplink control channel in the ith time resource unit, and end with an end symbol that is used to transmit the uplink control information in the ith time resource unit; or
some symbols that are used to transmit the uplink control information in the ith time resource unit start from the first symbol after a frequency hopping point of a first physical uplink control channel in the ith time resource unit, and end with the last symbol before a frequency hopping point of a second physical uplink control channel, and the ith time resource unit comprises frequency hopping points of at least two physical uplink control channels; and
the ith time resource unit is any one of the M time resource units.

14. The method according to claim 12, wherein before the receiving, by the network device, first uplink control information sent by the terminal device, the method comprises:
sending, by the network device, first information to the terminal device, wherein the first information is used to indicate symbols occupied by the first uplink control information in the M time resource units.

15. The method according to claim 14, wherein:
the symbols occupied by the first uplink control information in the M time resource units are all the symbols that are used to transmit the uplink control information in each of the M time resource units; or
some symbols that are used to transmit the uplink control information in each of the M time resource units, or some symbols that are used to transmit the uplink control information in each of M1 time resource units and all symbols that are used to transmit the uplink control information in each of M2 time resource units, wherein M1+M2=M, where both M1 and M2 are positive integers.

16. The method according to claim 14, wherein:
the M time resource units comprise a frequency hopping point of only one physical uplink control channel, and M=1; and
if a first value is less than or equal to a target value, the symbols occupied by the first uplink control information in the M time resource units are X symbols that are used to transmit the uplink control information in the M time resource units; or
if the first value is greater than the target value, the symbols occupied by the first uplink control information in the M time resource units are all the symbols that are used to transmit the uplink control information in the M time resource units,
wherein
the first value and the target value are determined based on the quantity of symbols that need to be occupied to transmit the first uplink control information and the quantity of symbols that are used to transmit the uplink control information in each of the N time resource units, and
X is a quantity of symbols starting from a start symbol that is used to transmit the uplink control information in the M time resource units, and ending with the last symbol before a frequency hopping point of the physical uplink control channel in the M time resource units, or
X is a quantity of symbols starting from the first symbol after the frequency hopping point of the physical uplink control channel in the M time resource units, and ending with an end symbol that is used to transmit the uplink control information in the M time resource units.

17. The method according to claim 16, wherein the first value is a difference between the quantity of symbols that need to be occupied to transmit the first uplink control information and a total quantity of symbols that are used to transmit the uplink control information in the N−M time resource units, and the total quantity of symbols that are used to transmit the uplink control information in the N−M time resource units is determined by the terminal device based on a quantity of symbols that are used to transmit the uplink control information in each of the N−M time resource units.

18. The method according to claim 16, wherein the target value is less than or equal to X.

19. The method according to claim 12, wherein before the receiving, by the network device, first uplink control information sent by the terminal device, the method comprises:
sending, by the network device, third information to the terminal device, wherein the third information is used to indicate, for the terminal device, and one or more of a start location or an end location of the symbol that is occupied by the first uplink control information in each of the M time resource units, so that the terminal device determines the symbols that are occupied by the first uplink control information in the M time resource units.

20. The method according to claim 12, wherein before the receiving, by the network device, first uplink control information sent by the terminal device, the method comprises:
sending, by the network device, second information to the terminal device, wherein the second information is used to indicate a quantity of symbols that need to be occupied to transmit the first uplink control information, so that the terminal device determines the symbols that are occupied by the first uplink control information in the M time resource units.

* * * * *